Figure 1:
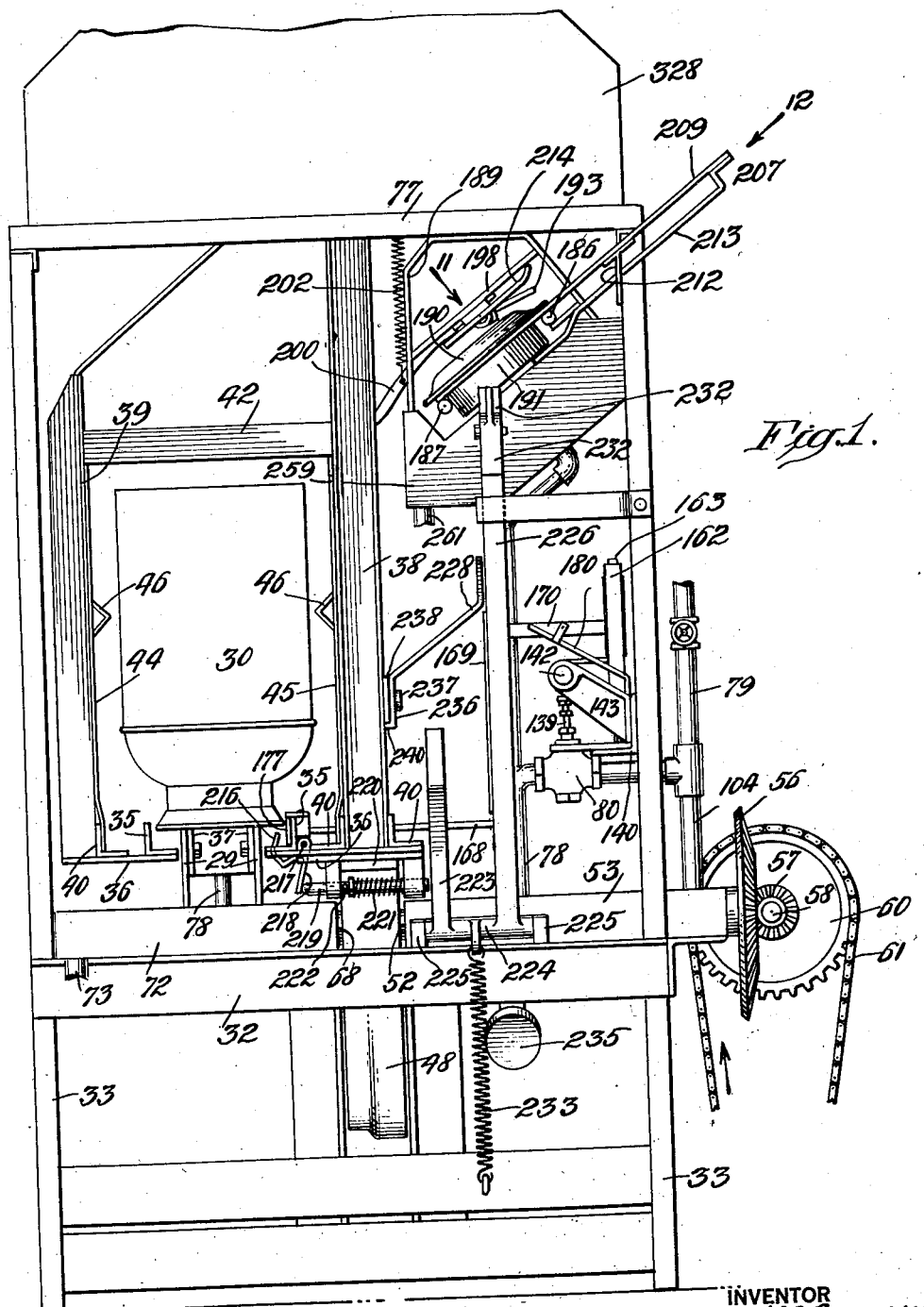

June 13, 1933.  J. M. McCLATCHIE  1,914,144
MACHINE FOR WASHING CANS AND THE LIKE
Filed April 17, 1930   17 Sheets-Sheet 1

INVENTOR
JOHN M. McCLATCHIE
BY Archibald Cox
ATTORNEY

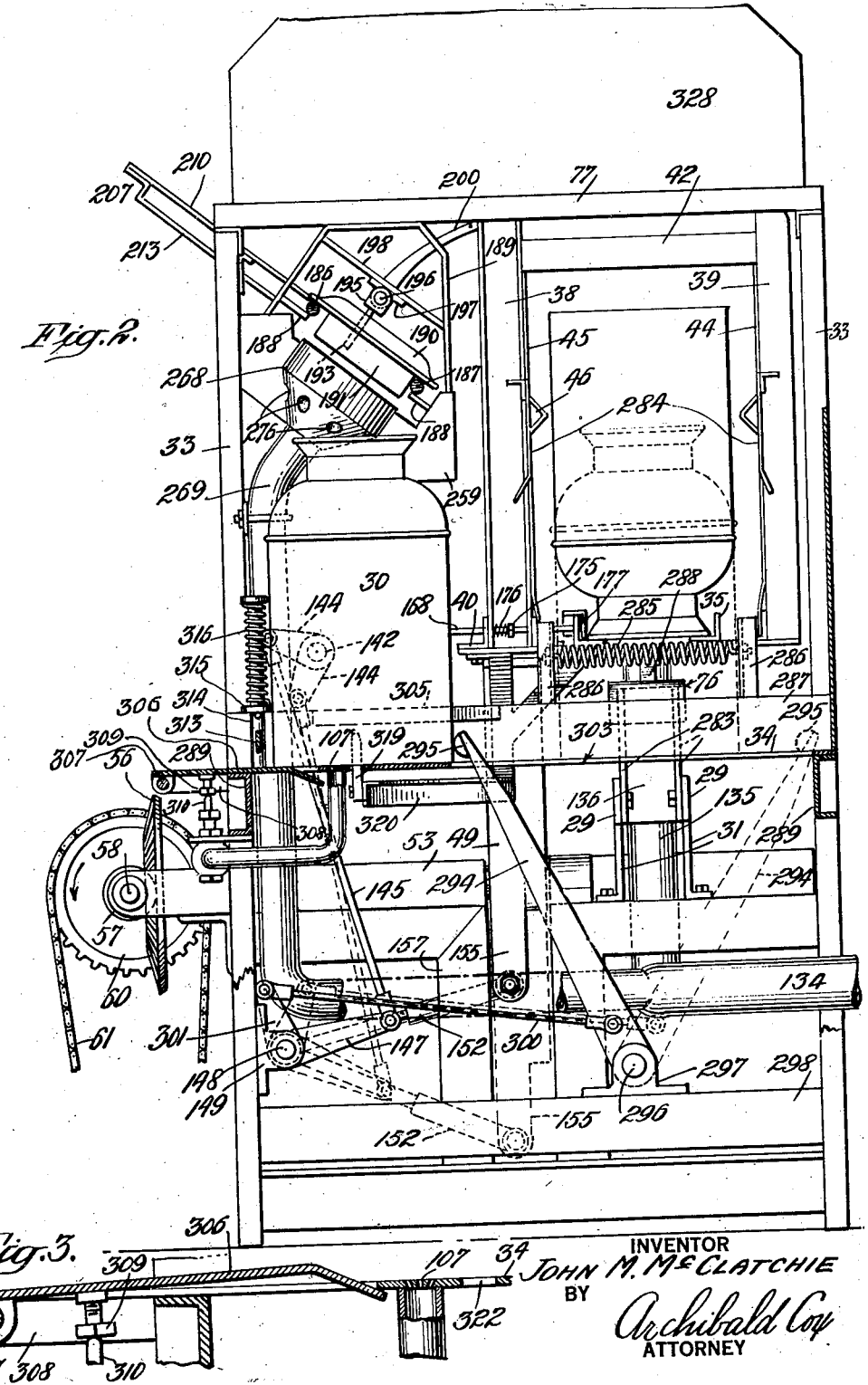

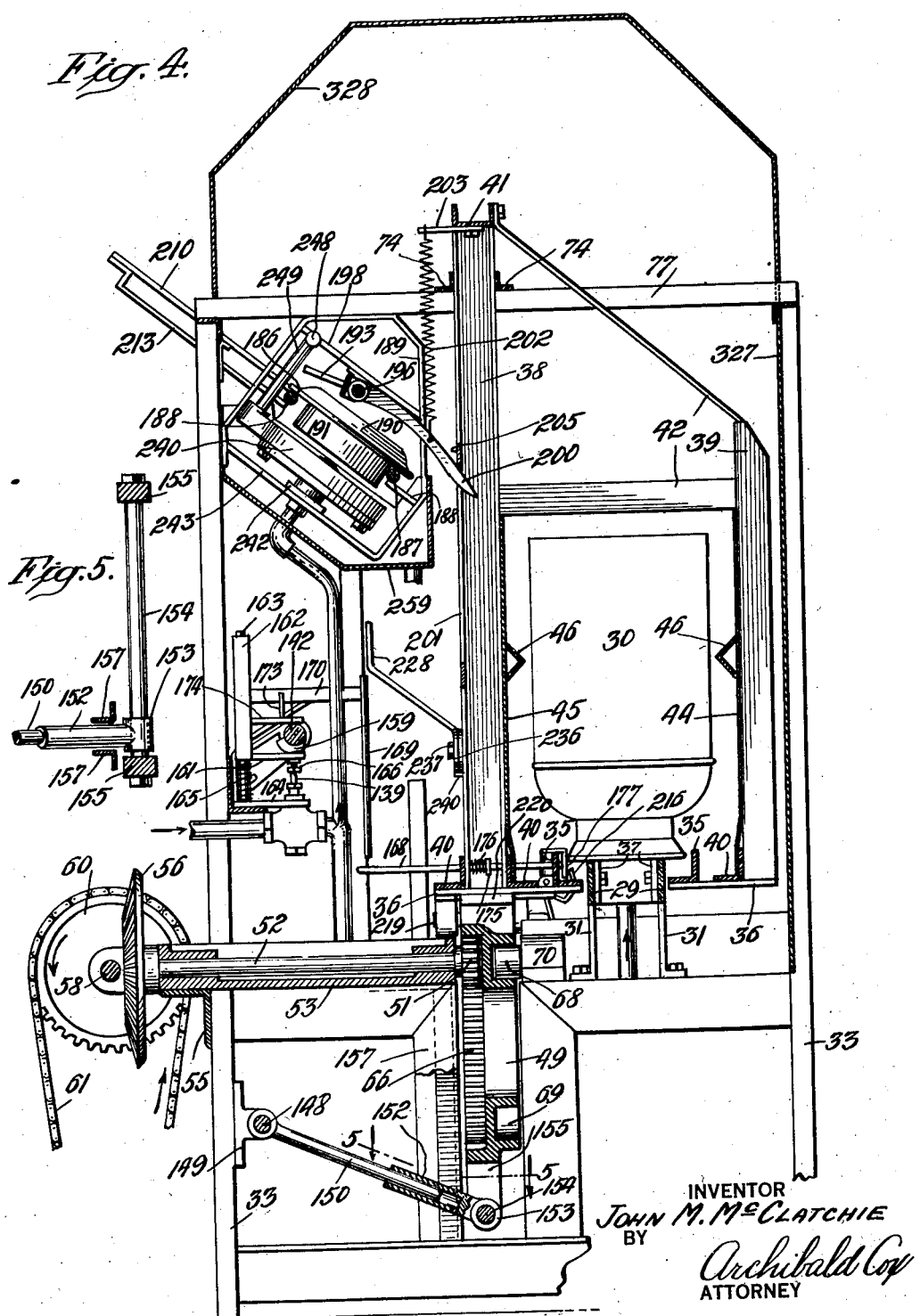

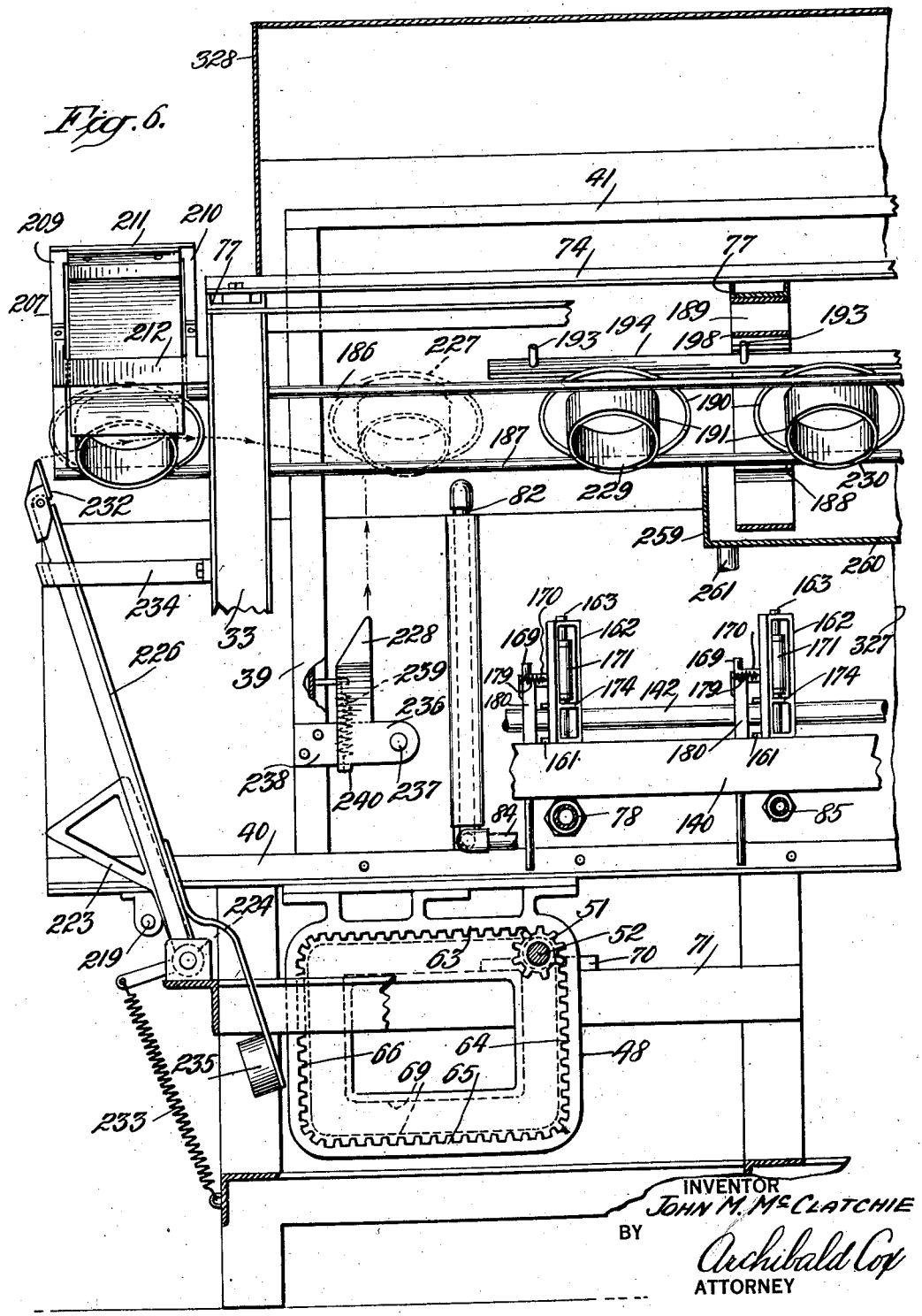

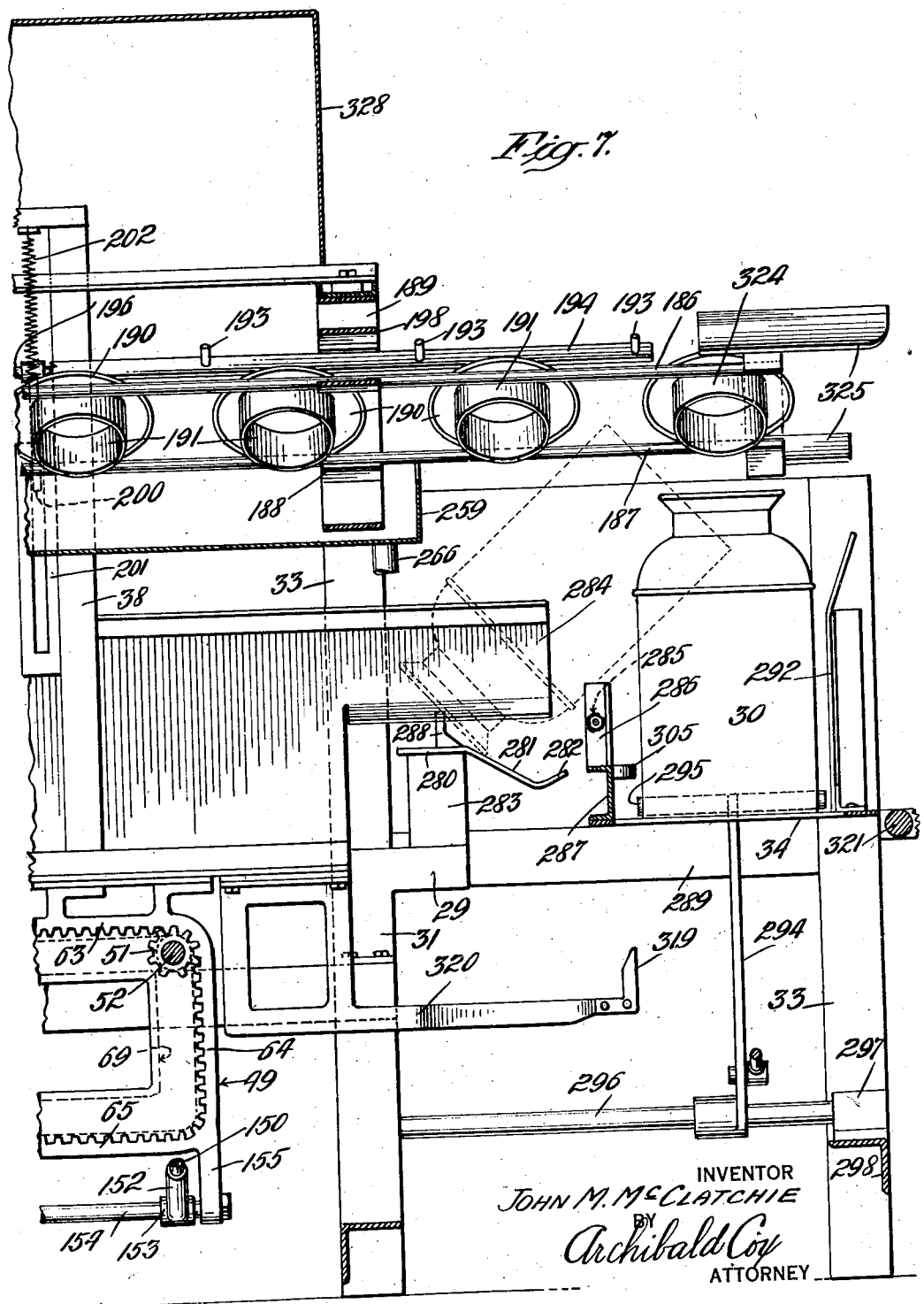

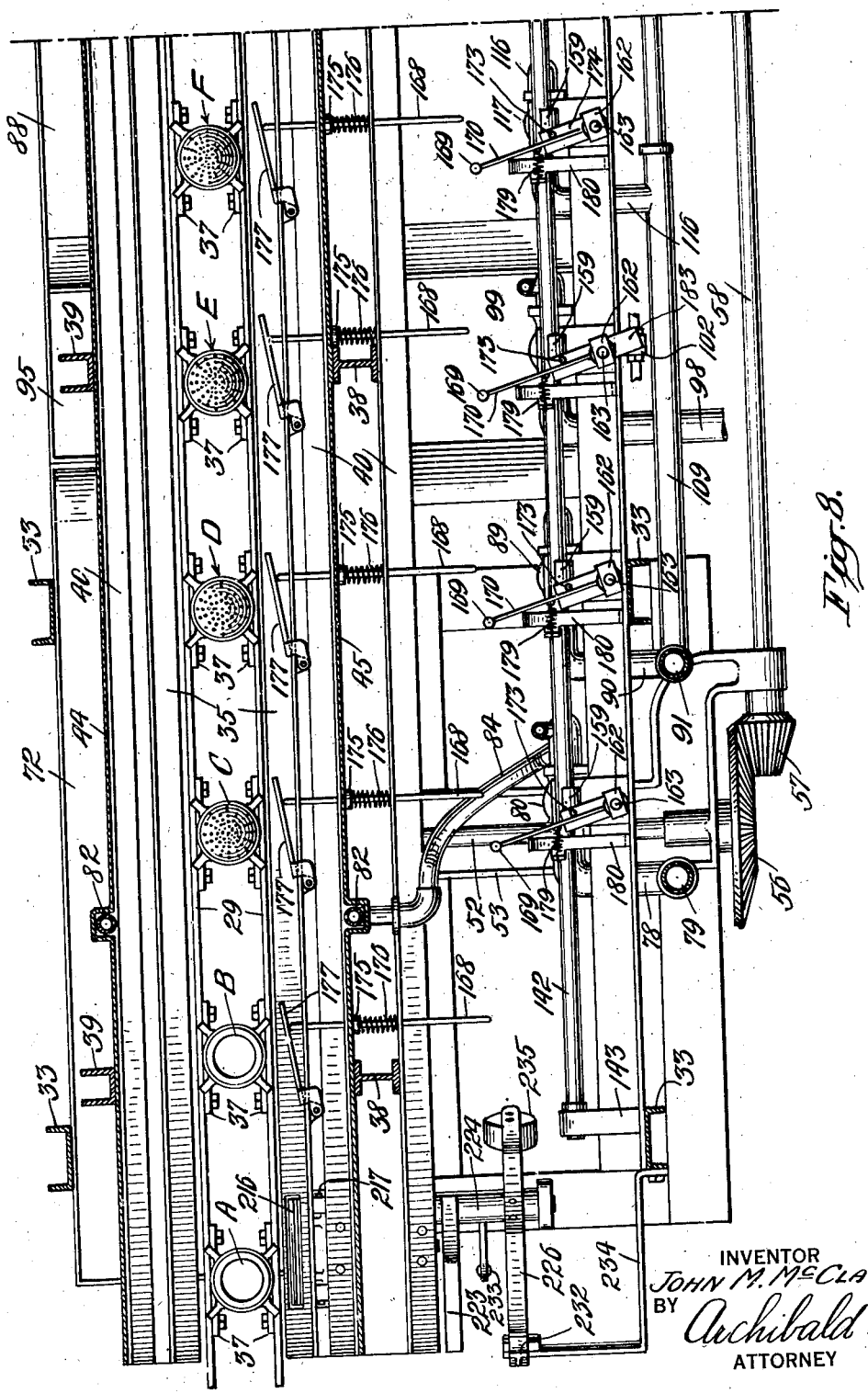

June 13, 1933. J. M. McCLATCHIE 1,914,144
MACHINE FOR WASHING CANS AND THE LIKE
Filed April 17, 1930 17 Sheets-Sheet 7
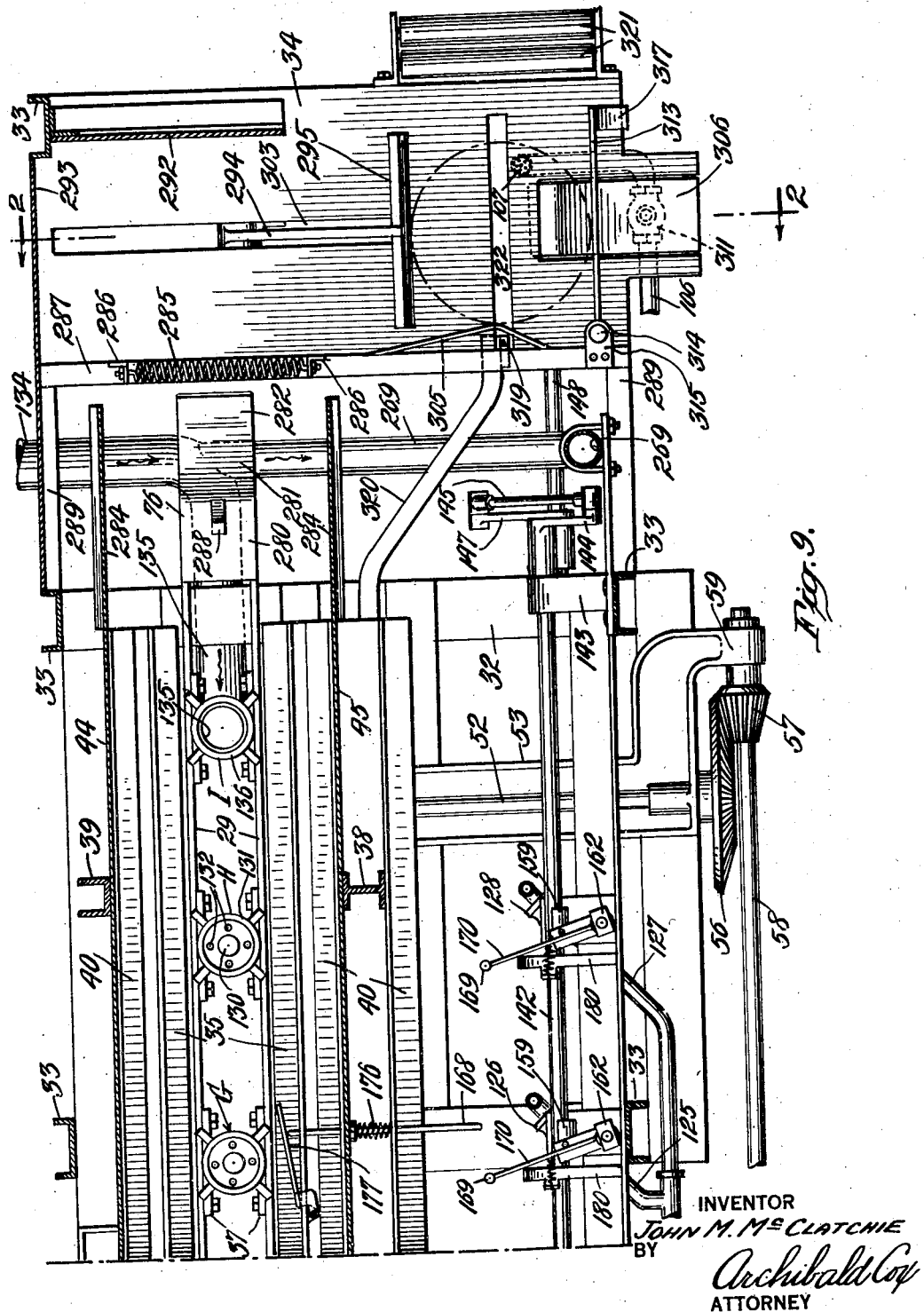
INVENTOR
JOHN M. McCLATCHIE
BY
Archibald Cox
ATTORNEY

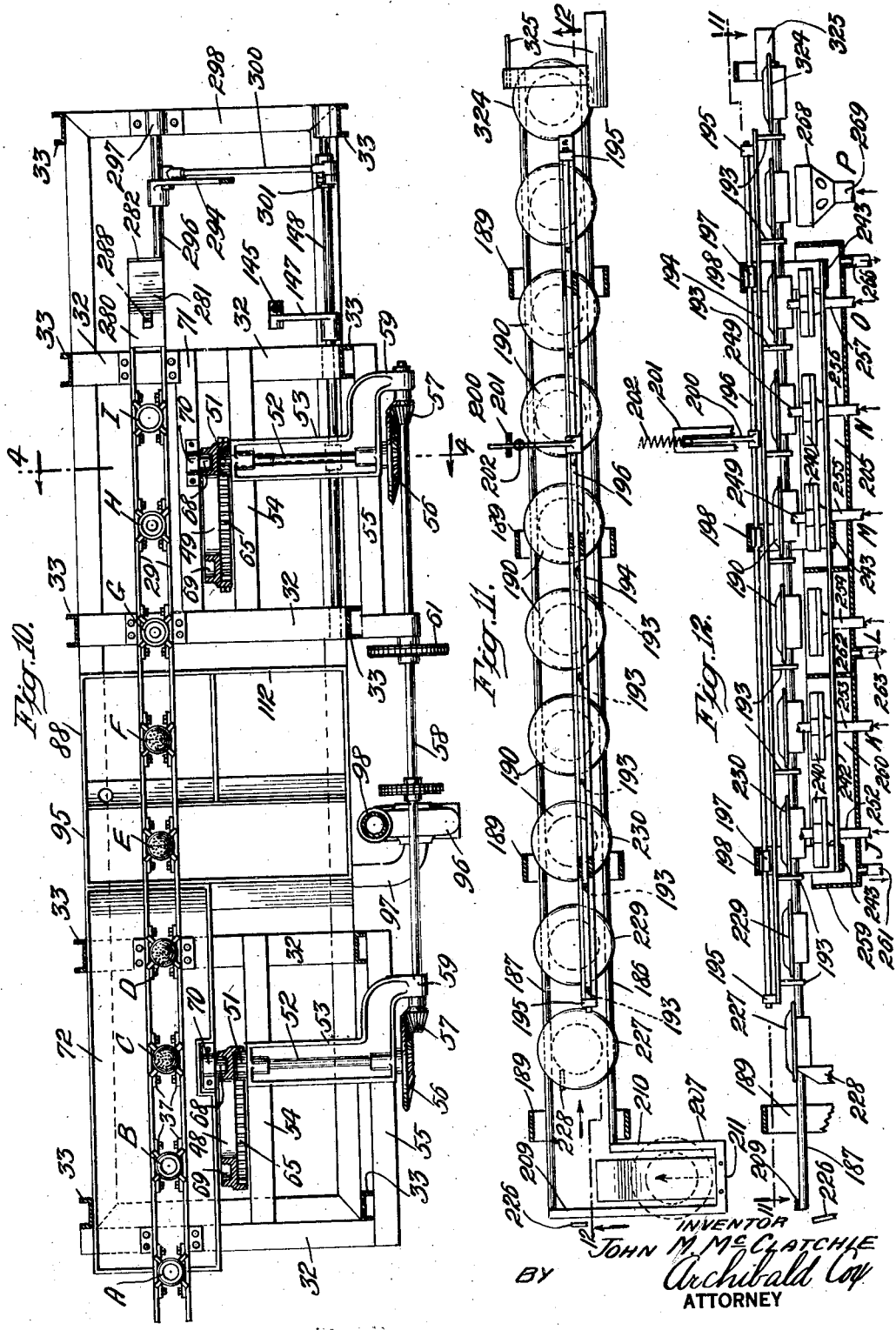

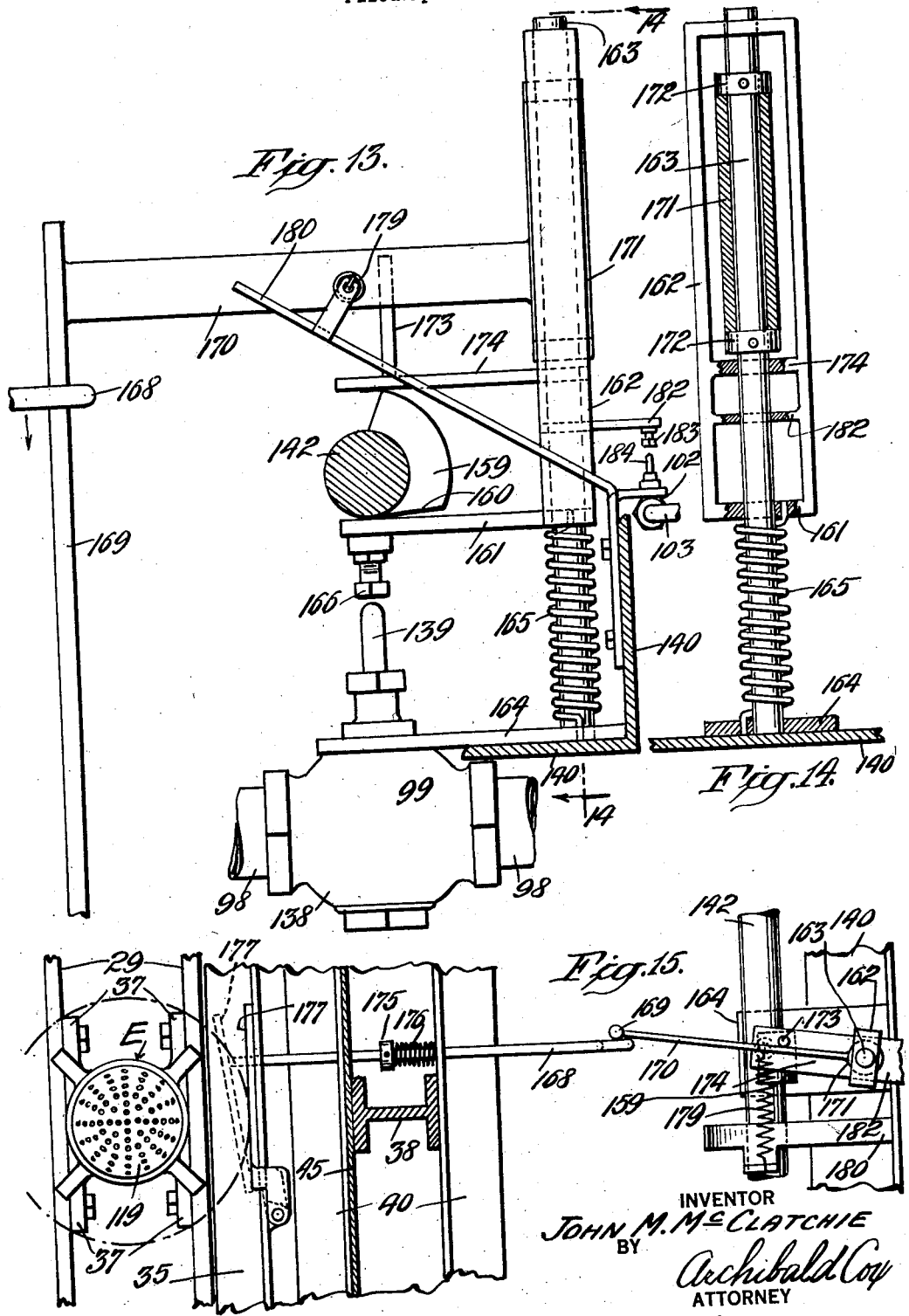

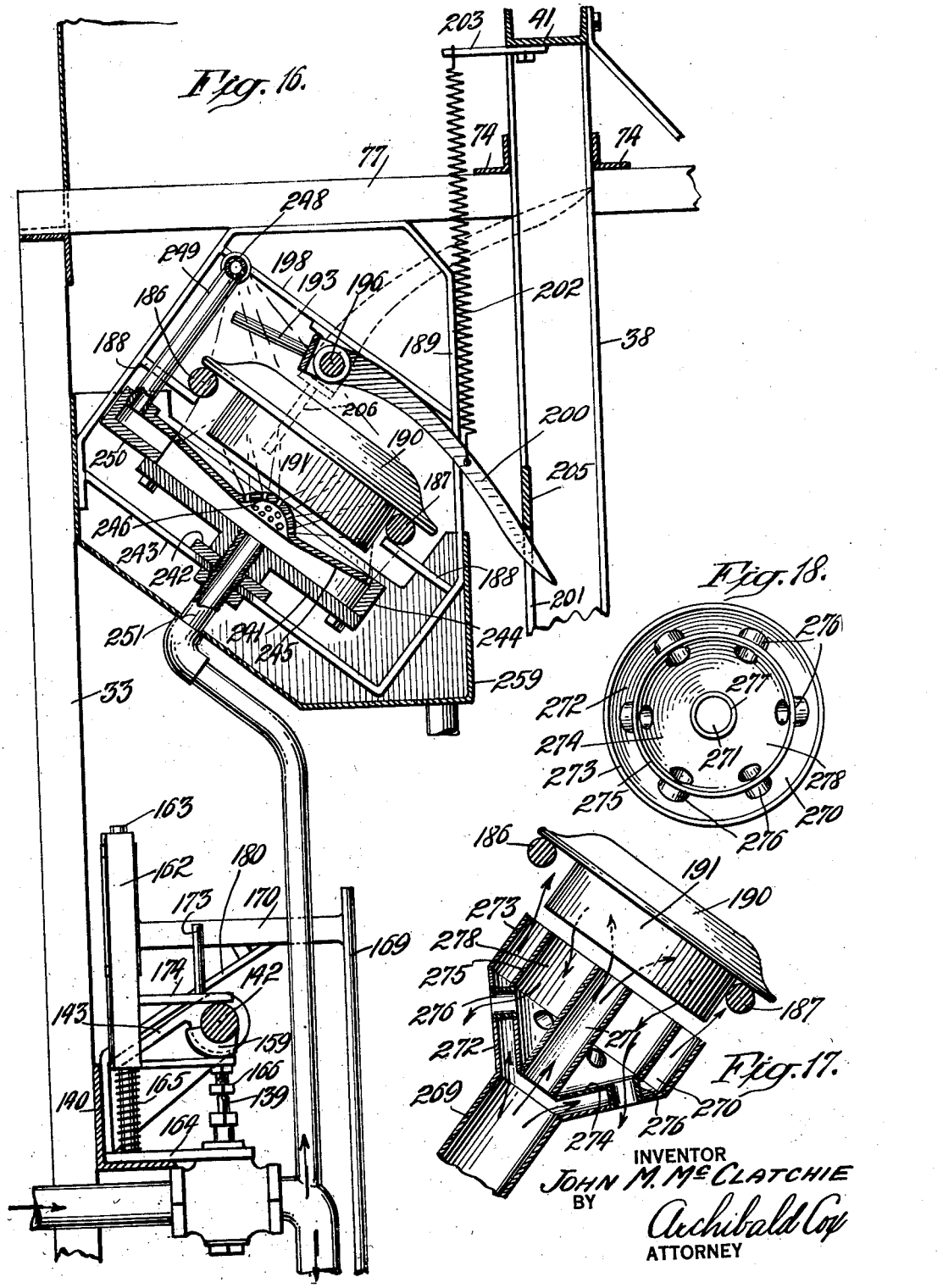

June 13, 1933.  J. M. McCLATCHIE  1,914,144
MACHINE FOR WASHING CANS AND THE LIKE
Filed April 17, 1930  17 Sheets-Sheet 11
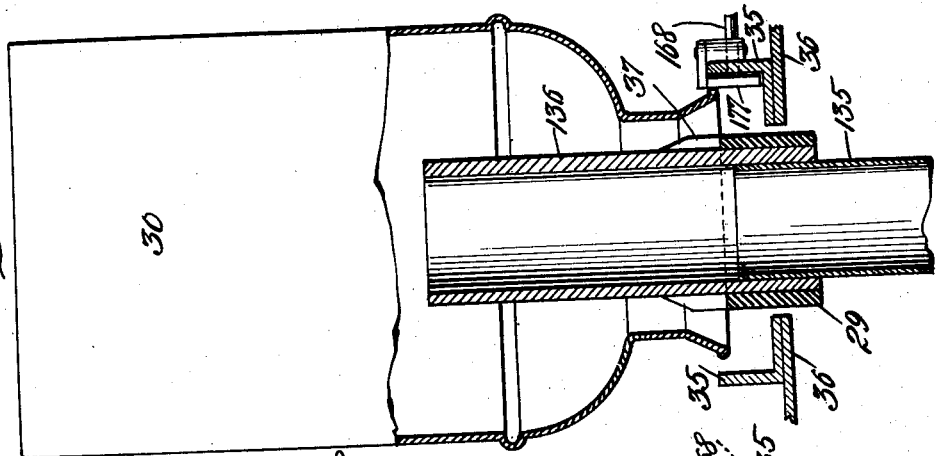
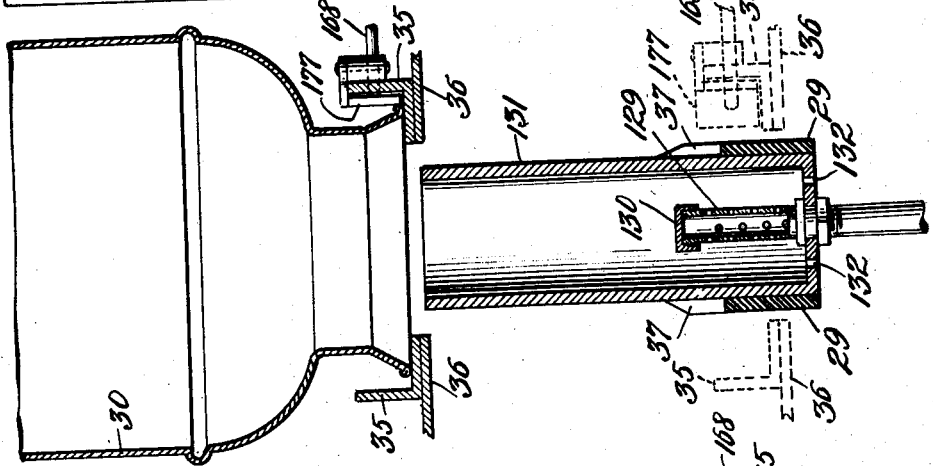
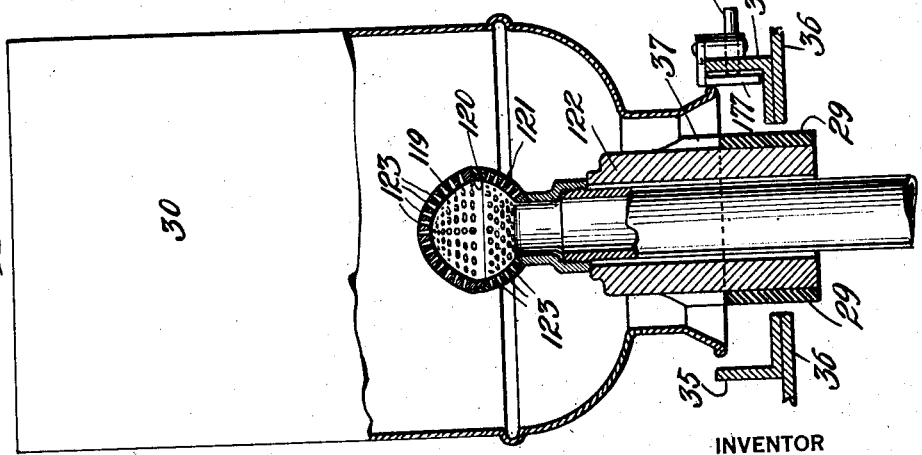
INVENTOR
John M. McClatchie
BY
Archibald Cox
ATTORNEY

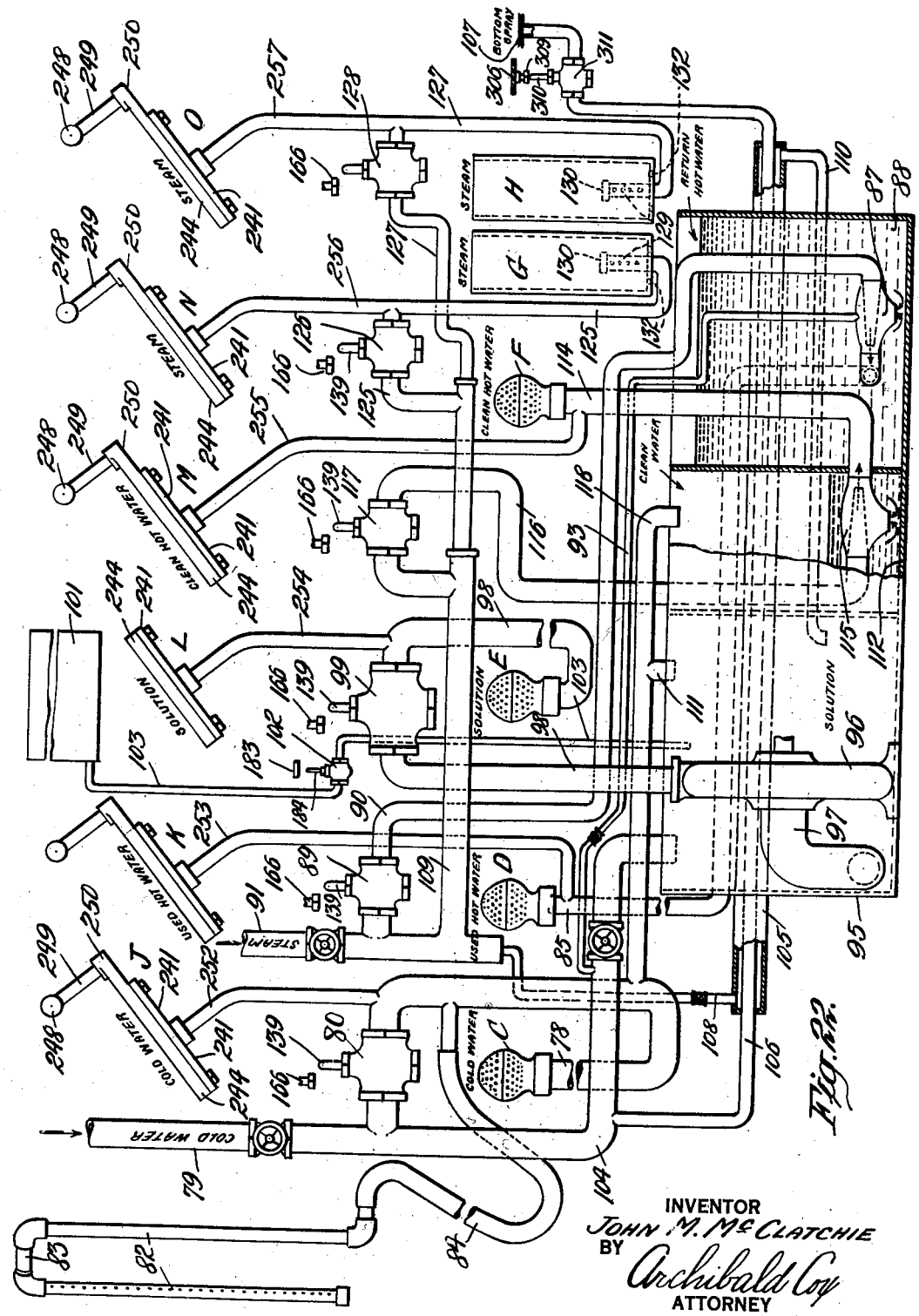

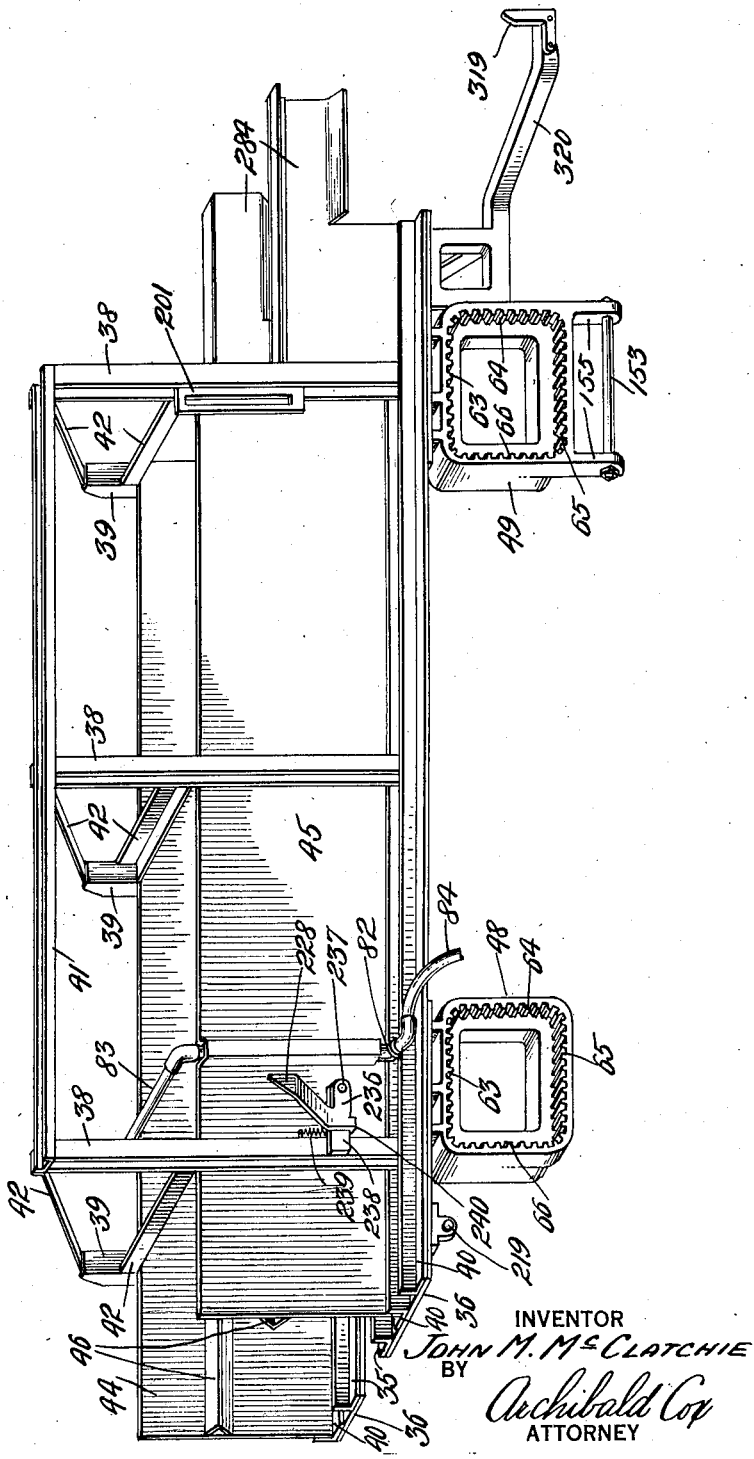

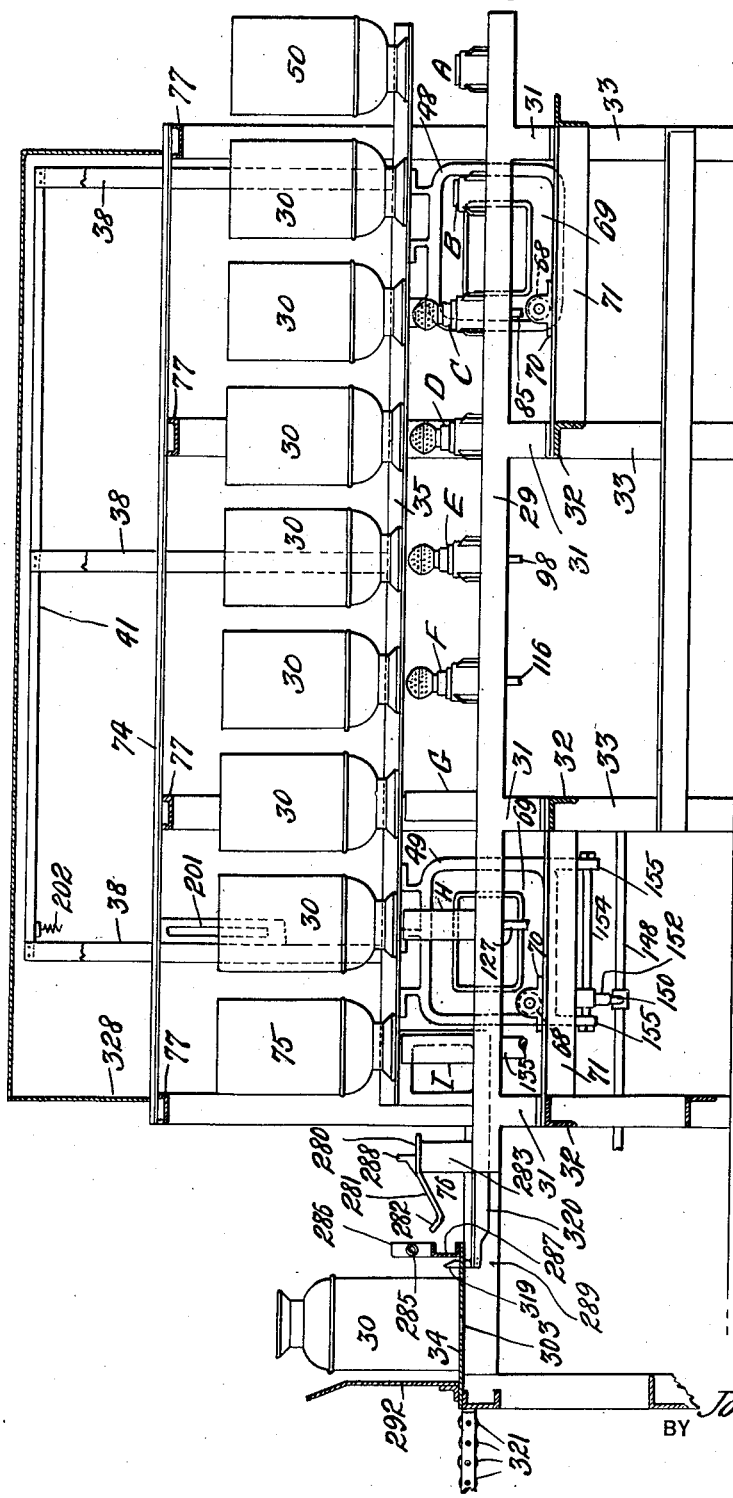

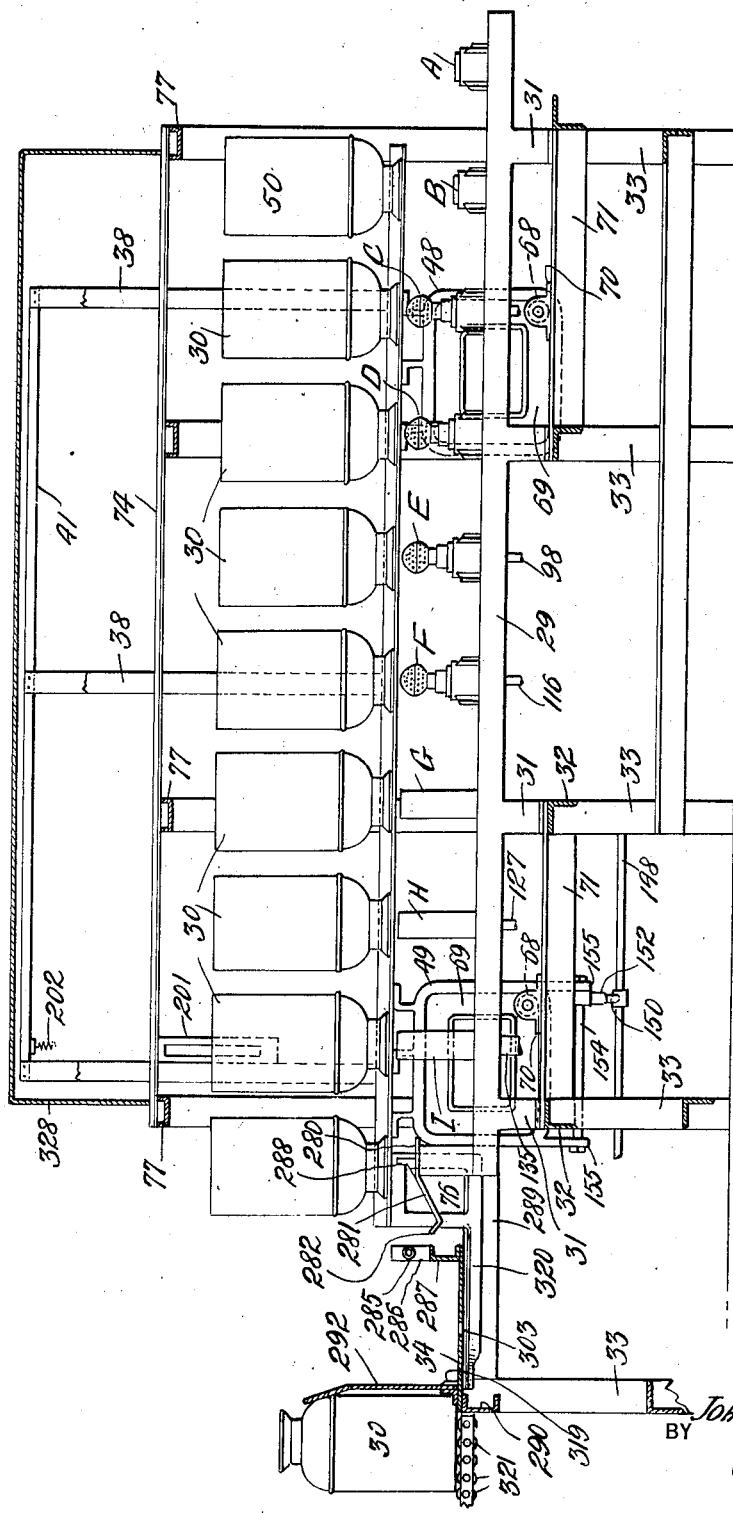

June 13, 1933.　　J. M. McCLATCHIE　　1,914,144
MACHINE FOR WASHING CANS AND THE LIKE
Filed April 17, 1930　　17 Sheets-Sheet 17

INVENTOR
John M. McClatchie
BY
Archibald Cox
ATTORNEY

Patented June 13, 1933

1,914,144

UNITED STATES PATENT OFFICE

JOHN M. McCLATCHIE, OF NEW YORK, N. Y., ASSIGNOR TO THE BORDEN COMPANY, OF NEW YORK, N. Y., A CORPORATION OF NEW JERSEY

MACHINE FOR WASHING CANS AND THE LIKE

Application filed April 17, 1930. Serial No. 444,963.

The invention relates to an improvement in machines for washing cans and the like, and more particularly to an improvement in machines for washing, sterilizing and drying the relatively large cans used for transporting fresh milk from the point of production to the receiving and treating stations.

The object of the invention is to produce a can washing machine which is cheaper to build and operate, is smaller, more compact and composed of fewer parts, and is more efficient and durable than the can washing machines heretofore constructed or proposed.

In accordance with this object one feature of the invention consists in the provision of novel means for advancing the cans through the machine. In machines of this character the universal practice is to hold the can in inverted position while subjecting the interior or inner surfaces of the can to the cleansing operation. It has been found that the most efficient and thorough cleansing is secured when the nozzles of the cleansing devices are inserted in the cans during the washing, sterilizing and drying operations. For this reason it has been proposed, either to lower the cans over fixed nozzles or to hold the cans stationary and lift the nozzles into them, and machines embodying both of these arrangements have been built and used. But such machines have heretofore been complicated in construction and consequently expensive. In the machine of the present invention there is provided a stationary, longitudinally-extending can support, with a series of fixed, equally-spaced nozzles projecting upwardly from the can support. The means for advancing the cans through the machine, that is, along the support, and for successively placing the cans over the nozzles comprises a carriage having a four-step cycle of movements, first, upwardly, lifting the cans clear of the nozzles; second, forwardly, advancing the cans one step toward the discharge end of the machine and positioning the cans over the next succeeding nozzles; third, downwardly, lowering the cans over the nozzles and placing them on the can support; and fourth, rearwardly, returning free of the cans to the initial point in the cycle of movements. The can transporting carriage is preferably a single unit and is shorter than the can support by about the length of one longitudinal step of the carriage. Consequently all the cans are lifted, advanced, and deposited over the nozzles simultaneously. The means for imparting the four-directional cycle of movements to the carriage comprises a pair of four-sided internal gears attached to the carriage and actuating means cooperating with the gears.

Another feature of the invention relates to the nozzles for directing the cleansing fluids against the interior surfaces of the cans. The tops of the nozzles all terminate on substantially the same level, and the distance the nozzles extend upwardly into the cans is that which will give the most effectiveness to the streams of fluid directed into the cans. Moreover the efficiency of the cleansing operations is increased by a novel arrangement of the apertures in the nozzles, both in the nozzles for directing the liquids into the cans and in the nozzles for directing the steam for sterilizing the interior surfaces of the cans, so that these operations are most effectively performed. The nozzles through which the liquid passes have tapered apertures, securing greater force in the streams of liquid discharged against the interior surfaces of the cans; and the nozzles directing the steam into the cans are so arranged that only live steam contacts with the inner surfaces of the cans, the condensate accompanying the steam being separated out.

Another novel feature of the invention relates to means for uprighting the can after it has passed through the cleansing operations and been dried. Advantage is taken of the downward stroke of the can carriage to effect the summersaulting of the can into upright position without employing any other moving parts than the carriage itself.

Another important feature of the invention is the reduction in the number of moving parts of the machine and the fact that the moving parts which are employed all receive their actuation from the can carriage, so that all the parts move in timed relation with the movements of the carriage. From this results pronounced simplification in construction and operation.

A further feature of the invention relates to the means for operating the valves which control the passage of the cleansing fluid to the nozzles. This means is so arranged that if a can is not at its station the valve corresponding thereto is not operated, but if a can is in position in the row of cans in the machine, the valve corresponding to the nozzle the can is approaching is operated. By the arrangement employed in the machine of the present invention the period during which the nozzles are in action is considerably longer than in former machines and consequently the cleansing action is more efficient and the number of stations or nozzles can be reduced without lessening the efficiency of the machine. The valves are brought into operation as the carriage descends, they are in operation during the whole of the return stroke of the carriage, and they continue in operation during the first part of the upward travel of the carriage, that is, until the carriage reaches a point corresponding to the point at which the valves are opened on the downward stroke of the carriage. In practice the valves are opened at about the point where the mouths of the cans are lowered over the nozzles and the valves are shut off as the mouths of the cans are passed upwardly beyond the nozzles.

Still another feature of the invention relates to means for depositing the covers on their respective cans. The covers are advanced through the machine in the usual manner on a cover runway which is located at one side of the machine and above the level at which the cans pass through the machine. After a can has been uprighted it is moved transversely of the discharge end of the machine to a position where the cover corresponding to the can will fall into the open mouth of the can.

The present invention comprises other novel features the advantages of which will be pointed out as the description proceeds, the improved machine of the invention being fully described hereinafter and the novel features thereof being particularly pointed out in the appended claims.

Figure 24:
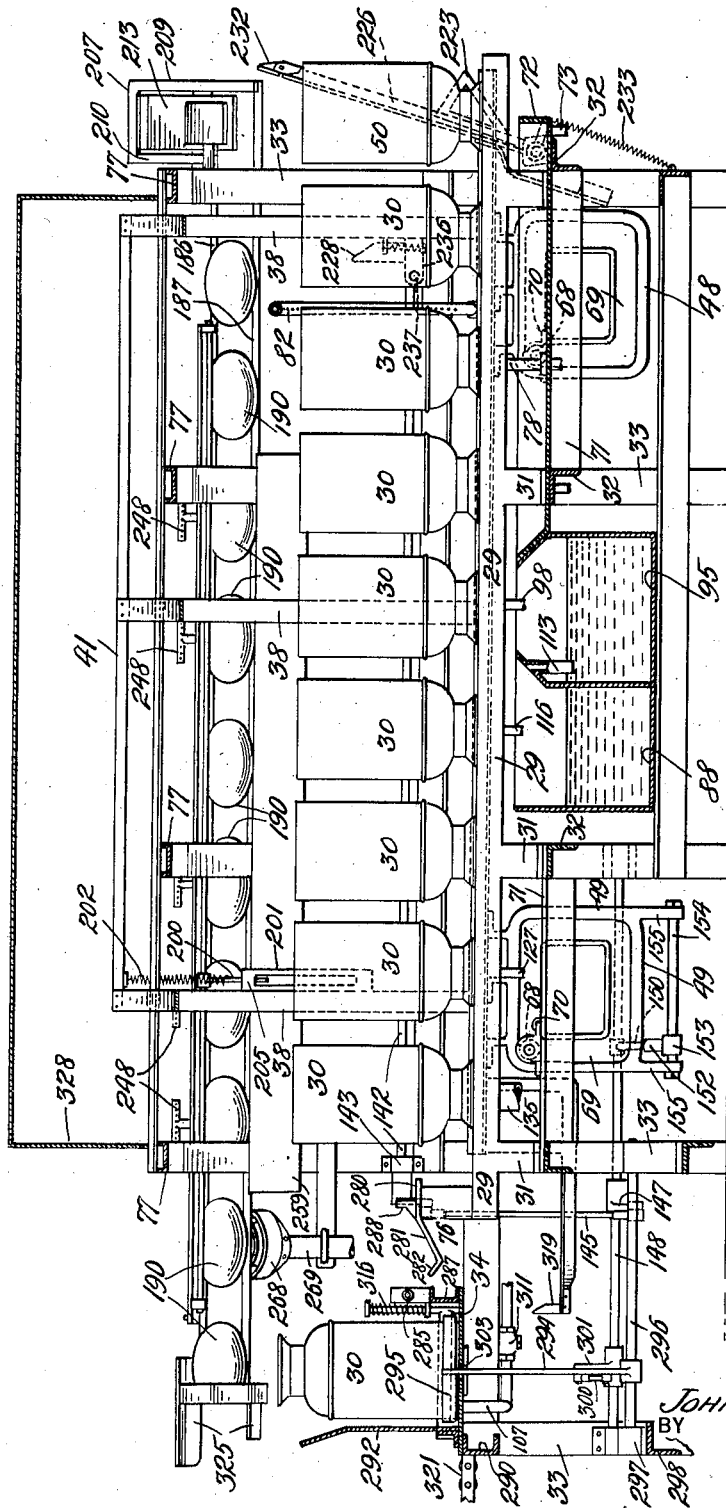
Figure 87:
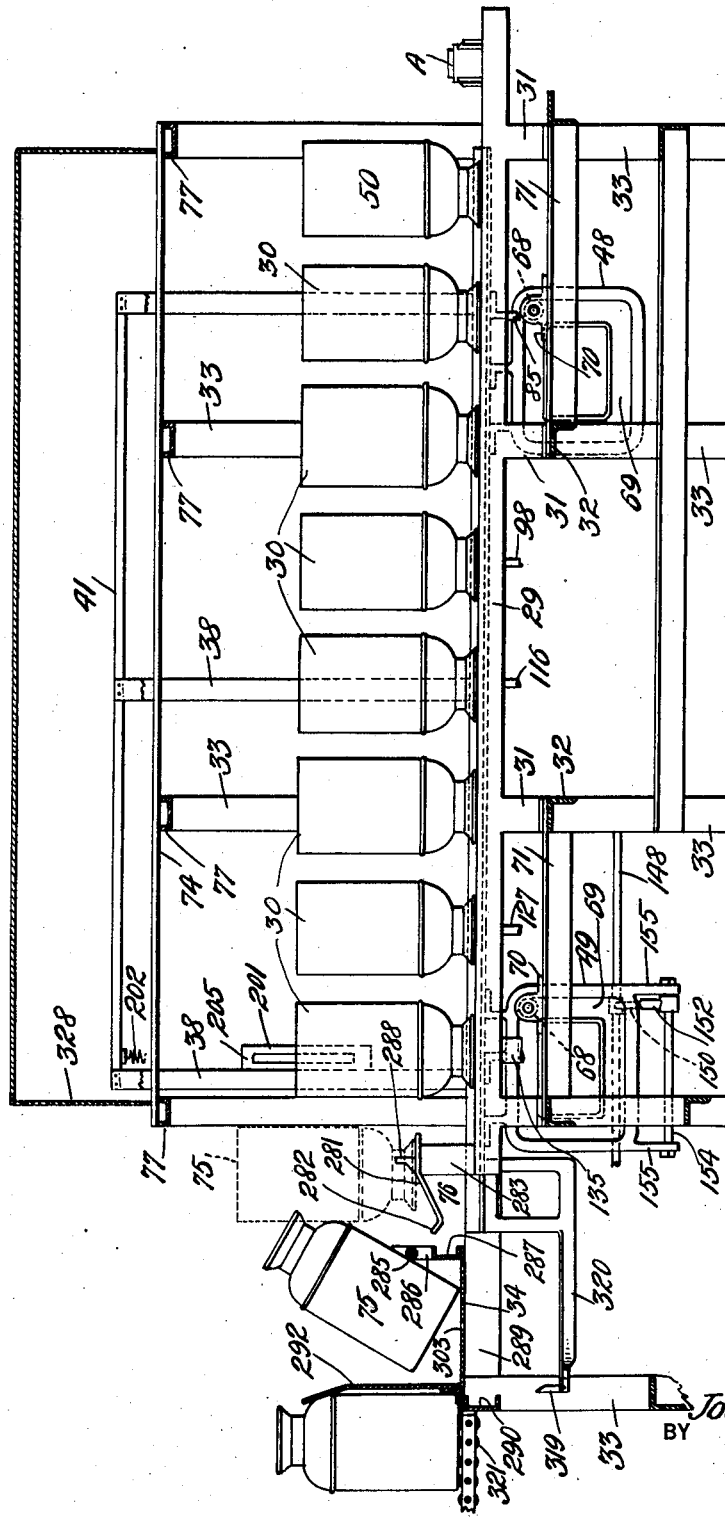

The preferred form of the invention is illustrated in the accompanying drawings, in which Fig. 1 is an elevation of the intake end of the machine, with certain parts removed in order to show the remaining parts more clearly; Fig. 2 is a sectional elevation of the discharge end of the machine, the section being taken on the line 2—2 of Fig. 9; Fig. 3 is an enlarged section of the means for washing the bottoms of the cans, the section being taken on the line 2—2 of Fig. 9; Fig. 4 is a transverse section taken on the line 4—4 of Fig. 10, but on an enlarged scale; Fig. 5 is a detail section taken on the line 5—5 of Fig. 4; Figs. 6 and 7 taken together are an enlarged elevation of the right hand side of the machine, with the middle section left out and with certain parts removed in order to show the other parts more clearly; Figs. 8 and 9 taken together are a longitudinal section through the complete machine in order to show the arrangement of the nozzles and of the valves for controlling them in top plan; Fig. 10 is a longitudinal section, on a reduced scale, of the complete machine, and showing more particularly the arrangement of the actuating means; Fig. 11 is a longitudinal section taken on the line 11—11 of Fig. 12, the view being taken looking in the direction of the arrow marked 11 in Fig. 1; Fig. 12 is a longitudinal section taken on the line 12—12 of Fig. 11, the view being taken looking in the direction of the arrow marked 12 in Fig. 1; Fig. 13 is an enlarged side elevation of one of the valves (that for controlling the solution nozzle) with its associated actuating parts; Fig. 14 is a section taken on the line 14—14 of Fig. 13; Fig. 15 is a partial top plan showing the arrangement of the parts for actuating a valve when a can is at a station; Fig. 16 is a detail sectional elevation of one of the valves and of one of the cover spraying heads; Fig. 17 is a longitudinal section through the discharge end of the air nozzle for drying the covers, and showing it in relation to a cover; Fig. 18 is a top plan of the air nozzle for drying the covers; Fig. 19 is an enlarged section through one of the fluid nozzles and showing it inserted up in a can; Fig. 20 is a section through one of the steam nozzles and showing it with relation to a can about to descend over it; Fig. 21 is a longitudinal section through the air nozzle for drying the cans and showing it inserted in a can; Fig. 22 is a diagrammatic view of the spray nozzles, of the valves controlling them, and of the sources of the fluid used in treating the cans and covers, the air ducts alone not being shown; Fig. 23 is an isometric perspective of the can transporting frame or carriage; and Figs. 24, 25, 26 and 27 are elevations (partly in section) of the left hand side of the machine illustrating the advance of the cans through the machine:—Fig. 24 shows the parts in the position in which an unwashed can has just been placed in the machine, a washed can has been uprighted, and the can transporting carriage about to rise; Fig. 25 shows the positions of the parts at the end of the upward travel of the can carriage; Fig. 26 shows the positions of the parts at the end of the can-advance movement of the carriage, and Fig. 27 shows the positions of the parts at the end of the downward travel of the carriage, placing the cans over the nozzles and uprighting the dried can.

The improved can cleansing machine of the present invention, as illustrated in the drawings, comprises a can support consisting of two longitudinally arranged bars 29 on which the cans 30 are supported in inverted position during the washing, sterilizing and drying operations. The can-supporting bars 29 are provided with the legs 31 mounted on the cross pieces 32 supported at their ends from the upright standards 33 forming part of the main or stationary frame of the machine. The bars 29 extend throughout the length of the machine, the right hand end of the bars, viewing Fig. 24, constituting the intake end of the machine, and the left hand end of the bars being the point at which the cans are uprighted onto the discharge platform indicated at 34. The spray nozzles for directing the washing, sterilizing and drying fluids into the cans extend upwardly from the can supporting bars 29 and are fixed in position between the bars by means of brackets 37.

The cans 30 are advanced through the machine from the intake end to the discharge end thereof and are successively lowered over the nozzles for the spraying operations by means of a transporting carriage or frame illustrated as a whole in Fig. 23. The can transporting carriage comprises two longitudinally extending, oppositely-faced angle bars 35 which are spaced apart far enough to support the flanged mouths of the usual styles of large milk cans. The bars 35 are supported on the inner edges of the transversely arranged pieces 36 which are secured to the lower edges of the three inner uprights 38 and the three outer uprights 39. The uprights 38 and 39 are held spaced apart by three longitudinally extending angle beams 40, the upper channel iron 41 and the cross pieces 42, so that the carriage is sufficiently rigid to perform the four-step cycle of movements in transporting or advancing cans through the machine without vibration. The carriage is provided with the outer guard plate 44 secured to the inner sides of the uprights 39 and with the inner guard plate 45 secured to the inner sides of the uprights 38. The angle irons 46 secured to the inner sides of the plates 44 and 45 with the apexes of their angles oppositely disposed extend throughout the carriage so as to assist in preventing the cans from chafing the plates 44 and 45 during the movements of the carriage relatively to the cans.

The means for imparting the four-step cycle of movements to the carriage to advance the cans through the machine and to place the cans over the nozzles comprises two rectangularly-shaped gear frames 48 and 49 secured to the under sides of the ends of the inner set of angle beams 40. Each frame 48 and 49 is provided with a four-sided internal gear the teeth of which constitute a rack adapted to be engaged by a pinion 51.

The pinions 51 are mounted on the inner ends of the transversely arranged shafts 52 journaled at their ends in the frames 53 which are supported at their inner ends on the angle irons 54 secured to the cross pieces 32 and at their outer ends on the angle irons 55 secured to uprights 33. On the outer ends of the shafts 52 are mounted the beveled gears 56 in mesh with the pinions 57, one of which is mounted on one end of and the other of which is mounted on the other end of the longitudinally arranged shaft 58 journaled at its ends in bearings 59 extending outwardly from the frames 53. The shaft 58 may be driven from any convenient source of power and for this purpose is provided with a sprocket wheel 60 and chain 61.

The shaft 58 rotates in a clockwise direction, viewing Fig. 1, or in a counter-clockwise direction, viewing Fig. 2. From this it will be readily understood that while the rotating pinions 51 are in mesh with the teeth of the upper gear sections 63 the can carriage is traveling backwardly or toward the intake end of the machine, that while the pinions are in engagement with the gear sections 64 the can carriage is rising or traveling upwardly, that while the pinions are in engagement with the lower gear sections 65 the can carriage is advancing toward the discharge end of the machine, and that while the pinions are in engagement with the gear sections 66 the can carriage is descending or traveling downwardly. The travel of the can carriage is substantially continuous, even at the points where it changes its direction of travel. However, the end of the backward movement or travel toward the intake end of the machine may be regarded as the point of beginning of the four-step cycle of movements of the carriage in transporting the cans through the machine. The carriage travels from the end of its downward stroke to the beginning of its upward stroke freed from the cans. During this movement of the can carriage the cans remain stationary on the can supporting bars 29. The angle beams 35 of the can carriage deposit the cans on the supporting bars 29 just before the completion of the downward stroke of the carriage, and the angle beams 35 re-engage the cans just after the beginning of the upward travel of the carriage.

The pinions 51 are held in proper engagement with the gear sections by means of the rolls 68 concentrically alined with the shafts 52, respectively, and traveling in the grooves 69 which are rectangular in outline and are formed in the rear sides of the gear frames 48 and 49, as best shown in Figs. 24 to 27 and also in Figs. 4 and 10. The rolls 68 are mounted in the journals 70 resting on the longitudinally extending angle irons 71 supported at their ends on cross pieces 32. The gear frames 48 and 49 are guided in their movements by the angle irons 54 and 71, and the upper parts of the uprights 38 of the can carriage are guided by the longitudinal angle irons 74 supported on the cross pieces 77 resting on the top ends of the uprights 33 of the stationary frame of the machine.

The nozzles for directing the washing, sterilizing and drying fluids into the cans may be regarded as stations at which each can pauses for treatment. These stations are indicated at A, B, C, D, E, F, G, H and I. The nozzles at stations A and B are false nozzles. These stations are provided partly to afford the operator opportunity to place an inverted can in the machine, as at station A, and partly to permit the milk or other substance remaining in the can to run out before the can is subjected to the preliminary cold water rinse. At station C the interior of the can is subjected to the cold water rinse, and at station D it is subjected to a hot water rinse. The nozzle at station E directs a washing solution into the can, and at station F the solution is removed from the interior of the can by a hot water rinse. At stations G and H the interiors of the cans are subjected to a steam bath, and at station I a stream of air, preferably cold, is directed into the can to dry it.

The carriage passes through its four-step cycle of movements to advance the cans along the can supports 29 and to place the cans over the nozzles successively in the following manner:—Assuming that the position of the carriage at the end of its movement toward the intake end of the machine is the beginning of its four-step cycle of movements, and that an operator has placed a can in inverted position over the false nozzle at station A, as indicated by the can marked 50 in Fig. 24, the first movement of the carriage is upward, bringing the angle beams or bars 35 into engagement with the flanged mouth of the can, and lifting the can to the position shown in Fig. 25. The next movement of the carriage is toward the discharge end of the machine, and at the end of this movement the can is positioned above the false nozzle at station B, as indicated in Fig. 26. The next movement of the carriage is downward, lowering the can over nozzle B until the flanged mouth of the can rests on the can supports 29, and then freeing the bars 35 from the can, which completes the downward movement as shown in Fig. 27. The fourth or final step of the cycle of movements of the carriage is the return movement freed from the can toward the intake end of the machine to the position shown in Fig. 24. During the next four-step cycle of movements of the carriage, the can which had been placed over station B is advanced to station C where it receives the preliminary cold water rinse. During the succeeding, continued four-step cycle of movements of the carriage the can in question is successively lowered over and lifted from the succeeding nozzles until the can is lowered over and raised from the air nozzle at station I. On the next movement of the carriage toward the discharge end of the machine the can marked 75 in Fig. 25 is moved to a position over a summersaulting device, indicated generally at 76, so that on the succeeding downward movement of the carriage the can 75 will be turned over into upright position on the platform 34, as shown in Fig. 27.

During the normal, continuous operation of the machine nine cans are acted on or treated simultaneously, that being the number of stations or nozzles, including the two false nozzles at stations A and B. In order to keep that number of cans constantly in the machine, the operator places an inverted can at station A when the carriage has removed a can therefrom and carried it to station B. While the cans remain at stations A and B, any milk residue in them drains into a pan 72 supported on the first two cross pieces 32. The pan 72 discharges through the pipe 73 into a sewer or other convenient receptacle. At stations C to I, inclusive, the interiors or inner surfaces of the cans are subjected to the series of treatments whereby they are thoroughly cleansed, sterilized and dried.

The nozzle at station C directs a spray of clean cold water against the inner surfaces of the can positioned over it in order to give it a thorough rinsing. The cold water is conducted up into the nozzle at station C through a pipe 78 connected with a cold water main 79. In the pipe 78 is located a pop valve 80, the operation of which will be described later. The drippings from the can at station C run into pan 72. At this point it is convenient to state that in the views showing the construction of the various parts of the machine in detail the piping connecting the nozzles with the tanks or other sources of the fluid for treating the cans is for the most part not shown, because in the actual machine most of the pipes follow devious courses and it would be difficult to illustrate them. Accordingly the whole arrangement of the piping in its relation to the nozzles, to the tanks and to the main sources of fluid supply, is illustrated diagrammatically in Fig. 22, and by referring to this figure in connection with the other figures showing in detail the actual construction of the parts, it will be readily understood how the fluids for treating the cans are conducted to the nozzles.

While a can is at station C the cylindrical exterior of the can, but not the bottom, is subjected to a cold water spray to remove any loose dirt adhering thereto. For this purpose there are provided two vertically arranged pipes 82 set in recesses formed in the guard plates 44 and 45 of the can carriage.

The pipes 82 are connected at their upper ends by a transverse pipe 83, and the lower end of the inner pipe 82 is connected by the flexible hose 84 with pipe 78 at a point where pipe 78 is controlled by the valve 80 so that the pipes 82 will be supplied with water under pressure only when pipe 78 is so supplied. The pipes 82 are perforated on their inner sides so as to direct streams of water against the opposite sides of the can at station C as the carriage is depositing the can at station C, is traveling toward the intake end of the machine and is passing through the first part of its upward movement. It will be understood, referring to Fig. 8, that when the carriage is depositing the can at station C the pipes 82 are between stations C and D, the carriage being shown in Fig. 8 at the limit of its return movement. The waste water dripping from the exterior surfaces of the can at station C falls into drip pan 72.

At station D the nozzle directs a stream of hot water against the interior surfaces of the can. The nozzle at station D is fed through the pipe 85 the intake end of which is connected with an injector 87 located in the bottom of a drip tank 88 positioned under the nozzle at station F. The valve 89 for controlling the passage of fluid through the nozzle at station D is located in a pipe 90 connected at one end with a steam main 91 and at its other end with the injector 87, which operates in the usual manner. The nozzle at station F is used to direct a final rinsing of hot water against the inner surfaces of the cans and consequently the water in tank 88 is generally too hot to permit of the maximum operation of the injector 87 by means of the steam passing through the pipe 90 into the injector. For this reason a constant but restricted stream of cold water from main 79 is fed into the injector 87 through the valve controlled pipe 93. The hot water drippings from the can at station D fall into the pan 72.

At station E the inner surfaces of the can are subjected to a thorough cleansing by streams of solution drawn from a tank 95 located under the nozzle at station E by means of a pump 96 driven from shaft 58. The intake of pump 96 is connected with the lower part of tank 95 through the pipe 97. The outlet of pump 96 is connected with the nozzle at station E through the pipe 98 in which is located the valve 99. The tank 95 is supplied with a determined quantity of concentrated solution from the tank 101 each time the valve 99 is operated. For this purpose the valve 102 located in the pipe 103 leading from the tank 101 into the tank 95 is operated each time the valve 99 is operated, as will appear presently. In making up the solution in tank 95 at the beginning of the day's run water may be admitted into the tank from the main 79 through the valve controlled pipe 104 connected therewith. The tank 95 is also supplied with distilled water from a steam jacket 105 which surrounds a pipe 106 leading from the pipe 104 to the nozzle 107 which directs a spray of water against the bottoms of the uprighted cans on the platform 34 just before they are discharged from the machine. The steam jacket 105 is used to heat the water passing through the pipe 106 in order that the bottom washing operation may be more effective. The jacket 105 is connected by the valve controlled pipe 108 with a pipe 109 supplied from the steam main 91. The condensate from the jacket 105 blows through the pipe 110 into the tank 95, as clearly indicated in Fig. 22. The tank 95 is also supplied with a definite quantity of water from the pipe 78 through the branch pipe 111 each time the valve 80 is operated.

At station F the inner surfaces of the cans are washed with clean hot water taken from a tank 112 located beside the tank 88 as best indicated in Fig. 10. In the diagrammatic arrangement of the means for washing and sterilizing shown in Fig. 22 the tank 112 is indicated as located between the tanks 88 and 95. The nozzle at station F is connected by the pipe 114 with the discharge of an injector 115 located in the bottom of tank 112. The intake of the injector 115 is connected by the pipe 116, in which the valve 117 is located, with the steam pipe 109. The tank 112 is supplied with a definite quantity of clean cold water through the branch 118 from the pipe 78 each time the valve 80 is operated. By this arrangement only so much water is admitted into the tank 112 as is necessary to assure the proper rinsing of the inner surfaces of the can at station F. The drippings from the can at station F fall into tank 88 where they are held to be used as the preliminary hot water rinse at station D. Overflow from tank 88 passes through the pipe 113 into tank 95. To prevent tank 95 from overflowing it may be provided with the usual overflow pipe leading to the sewer.

The nozzles at stations C, D, E and F are alike in construction and mode of operation and are provided with features whereby a quick and efficient treatment of the interior surfaces of the cans is secured. One of the nozzles is shown in enlarged longitudinal section in Fig. 19, and comprises a substantially spherical, hollow head made in two parts, the upper half or top 119 being a hemisphere provided on its lower edge with a threaded flange 120 which screws into the internally threaded upper end of the lower nozzle section 121, the lower end of which is made in pipe form and rests on the top of the central hollow section 122 of a bracket 37. Into the open lower end of the section 121 is threaded the upper end of the pipe leading from the valve which controls the nozzle.

It will be noted in the first place that the nozzle is large relatively to the can in comparison with the nozzles employed in former can washers in which the cans are slid or advanced along fixed, longitudinal supports by fingers. Consequently a greater volume of fluid can be directed against the inner surfaces of the cans within a given period. In the next place the apertures 123 in the walls of the nozzle heads are tapered, being larger at the interior surface than at the exterior surface of the heads. As a result, greater force is imparted to the fluid as it leaves the apertures, and so a more efficient cleansing action on the inner surfaces of the cans is obtained.

At stations G and H the interior surfaces of the cans are subjected to the action of live steam to kill any deleterious micro-organisms adhering thereto. The steam nozzles at stations G and H are alike in construction and operation. The nozzle at station G gives the can a preliminary steaming and the nozzle at station H simply repeats and makes more effective the action of the nozzle at station G. The nozzle at station G is connected with the steam pipe 109 by the branch pipe 125 in which is located the valve 126, and the nozzle at station H is connected with the steam pipe 109 by the branch pipe 127 in which is located the valve 128.

The construction and operation of the steam nozzles at stations G and H constitute a feature of the invention, but are not claimed herein. The construction of the nozzles is brought out most clearly by the enlarged longitudinal section shown in Fig. 20. Each nozzle comprises a central perforated pipe 129 having a closed top 130 located in the bottom of a cylindrical shell or casing 131 open at its top end and closed at its lower end except for the apertures 132 therein. Each shell or casing 131 is supported at its lower end from the bars 29 by one of the brackets 37. The center of the bottom of the shell or casing 131 is pierced to receive the lower end of the perforated pipe 129 which is secured to the upper end of the branch pipe 125 or 127. When the valve connected with each steam nozzle is opened the steam rushes up into the perforated pipe 129, carrying with it any condensate which has gathered in the pipe 109 or in the branch pipe 125 or 127 with which the nozzle in operation is connected. To prevent this condensate from being directed against the inner surfaces of the can and thereby interfere with the sterilizing action of the steam and make it harder later to dry the can, I provide the perforated pipe 129 with the cap 130 which compels the steam to leave the pipe 129 laterally through the relatively small apertures therein and pass out of the casing 131 at its upper end. During the steaming of the interior surfaces of the can, the nozzle will of course be inserted up in the can. The condensate carried by the steam will impinge against the inner walls of the casing 131 opposite the apertures and will fall down onto the bottom of the casing and pass out through the holes 132. Consequently only steam freed from condensate will be driven against the inner surfaces of the can and it will therefore be understood that a very effective sterilizing action will be obtained. The drip from the bottoms of the casings 131 may fall into a receptacle provided for the purpose or on the floor of the establishment.

At station I the inner surfaces of the can are subjected to a blast of air conducted from a conveniently placed blower by the pipe 134 with which the branch pipe 135 leading to the nozzle at station I is connected. The nozzle at station I is shown in enlarged section in Fig. 21 and consists simply of a cylindrical piece of tubing 136 supported at its lower end from the bars 29 by one of the brackets 37. When the can reaches station I from station H it is hot and full of hot vapor. The first action of the blast of air on the vapor in the can is to condense it. The next action of the air is upon the inner surfaces of the hot can. As the air strikes the hot metal surfaces it is warmed and it instantly gathers up the moisture on the surfaces against which it plays so that by the time the can leaves station I its interior surfaces are thoroughly dried although the can is still hot. The nozzle 136 at station I is not controlled by a valve. The blower or other source of air blast is in continuous operation and consequently a continuous stream of air issues from nozzle 136. On the completion of the drying operation the can is summersaulted into upright position on the platform 34 on the next downward stroke of the can carriage by means of the device 76, as indicated briefly above, the whole action being explained more in detail hereinafter.

The valves for controlling the passage of fluid through the nozzles at stations C to H, inclusive, are all alike in their arrangement and operation. Each valve, as shown in Fig. 13 (which illustrates the valve for controlling the solution nozzle) is a pop valve of usual form and operation and comprises a casing 138 and a vertically acting stem 139. The valves are all supported from a longitudinally extending angle iron 140 secured to the uprights 33 at the right hand side of the machine. The valves normally remain closed, and are opened by depressing the valve stems 139. The means for depressing the valve stems 139 comprises an oscillatory shaft 142 which receives its actuation from the can carriage. The shaft 142 is journaled in the upper ends of the brackets 143 extending inwardly from uprights 33 at the right hand side of the machine. On the right hand end of the shaft 142 (Figs. 8 and 9) is fixed an outwardly extending crank arm 144 pivotally connected with the upper end of a link 145 the lower end of which is pivotally connected with an inwardly extending crank arm 147 fixed on a shaft 148 journaled in brackets 149 supported from the inner side of uprights 33. On the shaft 148 is fixed a rod-like arm 150 the outer free end of which is slidingly received in a sleeve 152 provided with a head 153 slidingly mounted on a rod 154 carried by the lower ends of the downward extensions 155 of the gear frame 49. The arrangement is such that when the can carriage descends the shaft 148 is turned in a clockwise direction, looking from the discharge end of the machine, whereas the shaft 142 is turned in a counter-clockwise direction. When, however, the can carriage rises the shaft 148 is turned in a counter-clockwise direction, whereas the shaft 142 is turned in a clockwise direction. If cans are in the machine at stations corresponding to the valves, the valves are operated when the shaft 142 is turned on the descent of the can carriage, and the valves are released when the shaft 142 is turned on the rise or upward stroke of the can carriage. When the can carriage is moving longitudinally either toward the discharge end of the machine or toward the intake end thereof the rod 154 slides in the head 153 and the shafts 148 and 142 remain stationary. In order that the rod 154 and head 153 may not bind the sleeve 152 plays in a vertical slot formed by the uprights 157.

The means for actuating the valves from the shaft 142 comprises a series of segment-shaped cams 159 fixed on the shaft 142, with their lower edges 160 substantially horizontally arranged when the parts are in normal position, as shown in Fig. 13. Beneath each cam is located a plate 161 extending inwardly from a frame 162 loosely mounted on an upright rod 163 fixed at its lower end in a valve supporting plate 164 secured to the horizontal part of the angle iron 140. A double acting torsion and expansion spring 165 encircles the lower end of the rod 163 and has its upper end attached to the plate 161 and its lower end attached to the plate 164. The action of the spring 165 is to swing the plate 161 and normally hold the valve actuating member 166, adjustably secured to the underside of the forward end of the plate 161, out of alinement with the valve stem 139. The plate 161 is swung against the action of the spring 165 to aline the actuating member 166 with the valve stem 139, when a can is in position to be operated on, by means of one of the transversely arranged rods 168 carried by the can carriage. The rods 168 pass loosely through holes in the vertical sections of the inner angle irons 35 and 40. Each rod 168 is adapted to engage with a vertically arranged finger 169 depending from the inner end of an arm 170 provided with a hub 171 journaled on the upright rod 163 and retained in position thereon between the collars 172. As the arm 170 is swung under the action of the rod 168 it pushes against the pin 173 projecting upwardly from the plate 174 extending inwardly from the frame 162 and positioned above the cam 159, and thereby swings the frame so that the member 166 is alined with the valve stem. The cams 159 are located over the valve stems, respectively, and are of such length that they engage and depress the plates 161, irrespective of the position of the latter, each time the shaft 142 is oscillated on the downward stroke of the carriage, but unless a can is in position to be operated on, the member 166 is held out of alinement with the valve stem and its downward movement is ineffective.

The horizontally arranged rods 168 carried by the can carriage correspond in number to the valves, as will be seen by referring to Figs. 8 and 9. In these figures the can carriage is shown at the limit of its movement toward the intake end of the machine. In this position of the parts, the first rod 168 at the left hand end of the machine, that is, the rod opposite the false nozzle at station B, will engage with the finger 169 associated with valve 80 if the can carriage has found a can at station B and transported it to station C. If no can is in the machine at station B, then the rod 168 will pass inoperatively by the finger 169 as the carriage moves the rod now opposite station B to the point opposite station C. For this purpose each rod 168 is provided with a collar 175 against which acts a spring 176. The spring 176 normally presses the inner end of the rod 168 inwardly against one of a series of pivoted feelers 177 carried by one of the angle bars 35. When a can is at station B on the return movement of the can carriage the mouth of the can is engaged by the first feeler 177 and the feeler swung on its pivot point, pushing the rod 168 outwardly against the action of the spring 176. It will be noted, referring to Figs. 1 and 4, that the feelers 177 are vertically arranged plates which are of such height that when the can carriage is in its lowermost position leaving the cans supported on the bars 29, the upper edges of the feelers 177 project upwardly beyond the lower flaring edges of the mouths of the cans so as to be engaged thereby.

When a can is at station B on the return movement of the can carriage so that its mouth pushes the feeler 177 and the rod 168 outwardly, the carriage rises without disturbing the engagement between the mouth of the can and the feeler and then moves toward the discharge end of the machine to position the can over the nozzle at station C. As the carriage approaches the end of the step toward station C the rod 168 engages with the finger 169 (associated with valve 80) near its upper end and swings the arm 170 and all the parts connected with the frame 162 so as to aline the actuating member 166 with the stem 139 of valve 80 by the time the carriage has positioned the can over station C. On the downward stroke of the carriage the rod 168 remains in engagement with the finger 169 until the cam 159 has pressed the plate 161 and actuating member 166 downwardly against the stem 139 to unseat the valve. Thereupon the rod 168 passes below the lower end of the finger 169, which is shorter than the downward stroke of the carriage. When the finger 169 is released by the rod 168, a spring 179 connected at one end with the arm 170 and at its other end with the bracket 180 swings the finger 169 into normal position with the arm 170 resting against the free end of the bracket 180 which thus acts as a stop for determining the normal position of the finger 169. The actuating member 166, however, continues in engagement with the valve stem 139 under the action of the cam 159 while the carriage is completing its downward travel, is returning to the intake end of the machine, and is rising to the point or plane at which the cam on its downward movement engages with the plate 161. As the carriage moves upwardly the cam shaft 142 will rotate in the opposite direction and free the surface 160 of the cam 159 from the plate 161. Thereupon the double acting spring 165 will raise the plate 161 and swing it so as to move the actuating member 166 out of alinement with the valve stem, the arm 170 acting as a stop against which the spring 165 urges the pin 173.

The fingers 169 are shorter than the length of the downward stroke of the can carriage so that they may be disengaged from the rods 168 and return to normal position (while leaving the actuating members 166 holding the valve stems 139 depressed as the carriage returns to the initial point in its movements) to prevent the preceding rods 168 from getting behind the succeeding fingers 169. By way of illustration and still confining the description to the parts associated with stations B and C, it will be understood that if the arm 170 and finger 169 associated with valve 80 remained in operative position with the valve actuating member 166 as the carriage returned to initial position, the rod 168 located opposite station C in Fig. 8 would assume a position behind finger 169, and on the next movement of the carriage toward the discharge end of the machine would tend to carry the finger 169 with it and thereby cause a smash-up. This will more clearly appear from a further consideration of Fig. 8. In this connection see also Fig. 15. The can carriage and the parts mounted on it being at the limit of their left hand movement, that is, their movement toward the intake end of the machine, each rod 168 will move from the position shown in Fig. 8, on the movement of the carriage toward the discharge end of the machine, to the position occupied by the next preceding rod. In other words, the rod 168 now opposite station B will move to the position occupied by the rod opposite station C, and the rod now opposite station C will move to the position occupied by the rod opposite station D, and so on. By mounting the fingers 169 on the rods 163 independently of the plates 161, the fingers 169 are permitted to swing to normal position leaving the plates 161 and the actuating members 166 in engagement with the valve stems 139 while the carriage and the rods 168 return to the position shown in Fig. 8. Hence there is no liability of a preceding rod 168 engaging with and damaging a succeeding finger 169.

The mouths of the cans remain in contact with the feelers 177 until after the carriage has completed its downward stroke, depositing the cans on the supports 29, and has begun its travel toward the intake end of the machine. As the feelers pass beyond the mouths of the cans the springs 176 force the rods 168 inwardly and return the feelers to normal position, as shown in Fig. 8. If cans are at the stations toward which the feelers 177 are moving, the mouths of the cans will engage with the feelers as the carriage completes its return movement toward the intake end of the machine and the rods 168 will be pushed outwardly into position to engage with the fingers 169 on the next movement of the carriage toward the discharge end of the machine.

The parts for actuating the valve 99 for controlling the solution nozzle at station D are also availed of to effect the actuation of the valve 102 which controls the passage of concentrated solution from tank 101 into tank 95. For this purpose the frame 162 associated with valve 99, as shown in Fig. 13, is provided with the outwardly extending plate 182 to the under surface of the outer end of which is secured an actuating member 183 adapted to cooperate with the stem 184 of valve 102 when the plate 161 is swung to position the actuating member 166 over the stem of valve 99.

While the cans are passing through the machine and undergoing the washing, sterilizing and drying operations, the covers for the cans are also passing through the machine and are subjected to a similar washing, sterilizing and drying treatment. The runway along which the covers are advanced occupies the space above the valves and their associated parts at the right hand side of the machine, viewing Fig. 1. The covers are supported topside up in oblique position on two rails 186 and 187 fixed on the upper edges of the inturned fingers 188 of a series of frames or brackets 189 secured to the cross pieces 77. Each can cover consists of a flanged top portion 190 and a cylindrical or tubular neck portion 191 which fits in the mouth of the can. The covers are adapted to be slid along the rails 186 and 187 and since these are arranged on an inclined plane and the rail 187 is lowermost the cylindrical part of the cover will bear against the rail 187 and tend to rotate thereon as the cover is moved step by step toward the discharge end of the machine, but for the most part the covers slide along the rail 187. The rails 186 and 187 extend from a point opposite the false nozzle at station A to a point over the discharge platform 34, as shown in Figs. 6 and 7 and also in Fig. 24. See also Fig. 10 in relation to Figs. 11 and 12.

The means for advancing the covers step by step along the rails 186 and 187 comprises a series of fingers 193 secured to a longitudinally extending bar 194 provided at each end with a boss 195 secured to a shaft 196 journaled in the bearings 197 supported from the cross pieces or braces 198 in the upper part of the frames 189. The shaft 196 is positively oscillated in the direction to lift the fingers 193 above the plane passing through the top surfaces of the can covers and is yieldingly oscillated in the opposite direction to place the fingers 193 in cover-engaging position. For this purpose the shaft 196 is provided with an arm 200 the free end of which projects through a slotted plate 201 secured to the rearmost upright 38 of the can carriage. A contraction spring 202, the lower end of which is attached to the arm 200 and the upper end of which is attached to a pin 203 secured to the channel beam 41 normally holds the free end of the arm 200 against the top 205 of the slotted plate 201, as shown in Figs. 4 and 16. On the down stroke of the can carriage, part 205 engages with the arm 200, depresses the free end thereof and so oscillates the shaft 196 to lift the fingers 193 above the can covers, as shown in Fig. 16. As the can carriage rises the spring 202 holds the free end of the arm 200 against the underside of the part 205 and thereby causes the shaft 196 to oscillate and place the fingers 193 in cover-engaging position, as indicated by the dotted lines 206 in Fig. 16. If during the movement of the fingers 193 into cover-engaging position one of the fingers should encounter a misplaced cover the spring 202 will yield while the can carriage and part 205 complete their upward travel, and thus no injury will occur to any of the parts of the machine. While the fingers 193 are held above the tops of the can covers by the engagement of the part 205 with the arm 200, the can carriage is moving toward the intake end of the machine, and while the fingers 193 are in cover-engaging position the can carriage is moving toward the discharge end of the machine and consequently the fingers 193 advance the covers one step.

When the operator places a can in inverted position over the false nozzle at station A he places the cover on a hopper-like chute indicated generally at 207. The chute 207, as shown best in Fig. 1, is obliquely arranged and comprises two side or guide bars 209, 210, the lower ends of which are connected, respectively, with the rails 187 and 186, the outer or upper ends of the bars being connected by the cross piece 211. The bars 209 and 210 are supported in position by the bracket 212 extending from the first upright 33 at the right hand side of the machine. The chute is provided with the obliquely arranged bottom 213. When the can is placed in inverted position at station A the cover for the can is placed topside up in the chute, the lower edges of the cylindrical neck of the cover resting on the bottom 213 of the chute. The cover slides down the chute until the cylindrical neck portion thereof rests against the outer end of the lower rail 187, as shown in Fig. 1. Arranged over the lower end of the chute is a directing guard member 214 supported from the first brace 198.

As a matter of practice, the operator places the cover in the chute 207 before he places the inverted can at station A. The cover remains in the chute until its corresponding can has been placed at station A and the carriage has risen to lift the can. This method of operation is employed to prevent a cover from advancing through the machine unless accompanied by its can. The means for placing the cover within range of the fingers 193 so that the cover will be advanced through the machine when a can has been placed on the intake ends of the bars 29 at station A consists of a latch member 216 which works through a slot in the front end of one of the angle bars 35 and is pivoted to the bar at 217. The latch 216 is provided with a downwardly projecting dog 218 against which one end of a pin 219 slidingly mounted in a bracket 220 is pressed by a spring 221. The engagement of the dog 218 by the pin 219 under the action of the spring 221 holds the latch 216 projecting upwardly from the upper surface of the flat part of the angle bar, as shown in Figs. 1 and 4. A pin 222 fixed in the pin 219 acts as a stop to determine the normal position of the latch 216. When a can has been placed in inverted position at station A and the can carriage returns to the initial point in its cycle of movements, the latch 216 is positioned below the adjacent part of the mouth of the can, so that as the carriage rises the upper edge of the latch 216 encounters the mouth of the can and is thereby swung on its pivot point against the action of the spring 221. The pin 219 is thereby slid outwardly until its outer end is positioned below an obliquely arranged cam arm 223 extending upwardly from a hub 224 pivoted in the lugs 225 rising from the first cross piece 32. As the can carriage rises with the outer end of the pin 219 in engagement with the under surface of the cam arm 223 the hub 224 is turned and an arm 226 (also fixed on the hub 224) is swung into engagement with the cover in the chute 207 and moves it forward to the position occupied by the cover indicated at 227 in Figs. 6, 11 and 12. The distance from the chute 207 to the point 227 equals one longitudinal step of the carriage. This action takes place while the can carriage is rising and before it completes its full upward stroke. As the can carriage completes its upward stroke a finger 228 carried by the first upright 38 of the carriage is placed behind the cover so that on the next forward step of the carriage the cover at 227 is moved forward to the position occupied by the cover 229 in Figs. 6, 11 and 12, which is within range of the first cover-engaging finger 193. The advance of the can from station A to station B corresponds to the advance of the cover from the chute 207 to the point occupied by the cover marked 229. Since the can is not subjected to any treatment at station B so also the cover for the can is not subjected to any treatment while occupying the point indicated at 229. The advance of the can from station B to station C (the first can treatment station) corresponds to the advance of the cover from the point 229 to the point occupied by the cover marked 230 in Figs. 6, 11 and 12, the cover being subjected to its first treatment at this point.

The upper end 232 of the cover engaging arm 226 is pivotally mounted so that in case another cover has been placed in the chute before the arm 226 has returned to normal position its upper end 232 may be swung on its pivot point by the cover and so pass by the cover without injuring it. The end 232 of the arm 226 is mounted to return to normal position by gravity. The pin 219 passes beyond the upper end of the cam arm 223 near the end of the upward travel of the can carriage, and a spring 233 returns the arm 226 into normal position which is determined by a bracket 234. The arm 226 is provided with the counter weight 235.

The finger 228 is vertically arranged and is provided with a horizontally arranged lower end or arm 236 pivotally mounted at 237 on a longitudinally extending bracket plate 238 secured to the first upright 38. A spring 239 holds the finger 228 in normal position by pressing the inturned edge 240 of the part 236 into engagement with the lower edge of plate 238. The arrangement is such that in case the finger 228 is unable to push the cover from the point 227 forward to the point 229 the finger 228 will swing on its pivot point 237 and no damage will result either to the cover or to the machine.

The covers are subjected to the same kind of cleansing treatment as that to which the inner surfaces of the cans are subjected, namely, washing, steaming and drying. The stations at which the covers pause for treatment are indicated in Fig. 12 by the letters J to P inclusive. These stations correspond, respectively, to the stations C to I inclusive, except, as will be noted by comparing Fig. 10 with Figs. 11 and 12, the stations J to P inclusive are one step in advance of the stations C to I inclusive. The purpose of thus arranging the stations at which the covers are treated relatively to the stations at which the cans are treated is to secure the automatic placing of the cover in its can under the action of gravity, as will presently appear.

The nozzles at stations J to O, inclusive, for directing the cleansing fluids against the under surfaces of the covers are all alike in construction and consist of a hollow head indicated generally at 240. Each head 240 is composed of a bottom plate 241 secured to a flat bar 242 supported from the bottom brace or cross piece 243 of the brackets 189. Secured to the bottom plate 241 is a body portion 244 having a perforated top 245. The central portion of each top 245 of the cover nozzles is depressed and is provided with a knob-like perforated protuberance 246 for directing streams of fluid against the inner surfaces of the top and cylindrical portion of the cover. The periphery of the top 246 of each cover nozzle is provided with a circular row of apertures for directing the cleansing fluid against the outer surface of the cylindrical portion of the cover and against the bottom surface of the flanged portion of the top of the cover, the action of a nozzle 240 against a cover being clearly illustrated in Fig. 16. Each nozzle 240, except the one at station L for the solution treatment, is provided with a branch pipe 248 supported by a nipple 249 which screws into an extension 250 extending upwardly from the nozzle 240. The branch pipe 248 directs the cleansing fluid downwardly against the tops of the covers, as shown in Fig. 16. The bottom 241 of each nozzle 240 is provided with a central hole to receive a pipe 251 which connects the nozzle with its respective supply pipe. The nozzle 240 at station J is connected by the pipe 252 with the cold water pipe 78; the nozzle at station K is connected by the pipe 253 with the used hot water pipe 85; the nozzle at station L is connected by the pipe 254 with the solution pipe 98; the nozzle at station M is connected by the pipe 255 with the clean hot water pipe 114; and the nozzles at stations N and O are connected by the pipes 256 and 257 with the steam pipes 125 and 127, respectively. It is thus seen that when the valves controlling the nozzles at stations C to H are operated to permit the cleansing fluids to pass through the nozzles at those stations the cleansing fluids simultaneously therewith pass through the nozzles at stations J to O.

Beneath the nozzles J to O, inclusive, is located an elongated drip pan 259 to catch the drippings from the covers. The pan 259 is divided into compartments. The compartment 260 located under the nozzles at stations J and K is drained through the pipe 261 into pan 72, or if more convenient into the sewer. The compartment 262 under the solution nozzle at station L drains through the pipe 263 into the solution tank 95. And the compartment 265 under the nozzles at stations M, N and O drains through the pipe 266 into the tank 88.

When a cover has been subjected to the second sterilizing or steaming treatment at station O it is advanced to station P and dried by being subjected to a blast of air which is directed against the under surfaces of the cover by the air nozzle 268 connected with the air main 134 by the branch pipe 269. The air nozzle 268 is of novel construction and operation and is shown in detail in Figs. 17 and 18 but not claimed herein. The air nozzle 268 comprises an outer, annular discharge orifice 270 and a central discharge orifice 271. The annular orifice 270 is formed between an outer wall consisting of the conical section 272 and cylindrical section 273 and an inner wall consisting of the conical section 274 and cylindrical section 275. The contracted lower end of the outer conical section 274 is connected with the upper end of the pipe 269. The inner wall of the annular discharge orifice 270 is supported by and held spaced apart from the outer wall by means of the short exit pipes 276 which pass through the conical wall sections. The central discharge orifice 271 is formed by a pipe 277 supported at its inner or lower end by the contracted lower end of the inner conical wall section 274. Between the pipe 277 and the inner wall sections 274 and 275 is an annular exit passageway 278 which discharges through the pipes 276.

The mode of operation of the improved air nozzle 268 will be understood from a consideration of Fig. 17 in which the various air currents are indicated by the curved arrows. The blast of air passing through the central duct 271 is conducted against the interior surfaces of the cover and the moisture laden air is directed by these surfaces into the annular exit passage 278 whence it is discharged into the atmosphere through the openings 276. The air passing through the annular duct 270 is directed partly against the interior or inner surfaces of the cover and partly against the outer surfaces of the cylindrical portion 191 and the under surface of the flanged part of the top 190 of the cover. The air directed into the interior of the cover through the annular duct 270 is redirected into the exit passage 278 and thence through the openings 276, whereas the air directed against the exterior surfaces of the cover picks up the moisture therefrom and carries it directly into the atmosphere. It has been found unnecessary to direct a blast of air against the top 190 of the cover. The cover which is now thoroughly dried is in condition to be deposited upon its can which has just been subjected to a blast of air at station I.

When the dried can has been lifted from over the nozzle at station I and advanced through the next forward step of the can carriage it is positioned over the summersaulting device 76, as indicated above, so that on the next downward travel of the carriage the can is turned into upright position on the platform 34. The summersaulting device comprises a platform consisting of a horizontal section 280 and an oblique section 281 provided with an upturned lip 282. The part 280 of the device 76 is supported by the two uprights 283 rising from the forward ends of the bars 29. By referring to Figs. 26 and 27 it will be noted that the center line of the cans is slightly to the left of the point of junction between the horizontal section 280 and the slanting section 281 of the device 76. Consequently when the carriage on its downward stroke leaves the can on the platform 280, 281, the can immediately tilts, and the mouth of the can slides down the incline 281. The momentum of the can carries it forward and the cylindrical portion of the can strikes against a transversely arranged flexible bar or spring 285 supported by the standards 286 rising from a channel iron 287 transversely arranged across the discharge end of the machine and determining the rear edge of the platform 34. The momentum of the falling can as it strikes the spring 285 is sufficient to cause the can to turn right side up onto the platform 34 as shown in Fig. 25. In order that the mouth of the can may not slide backwardly along the horizontal section 280 of the platform as the cylindrical part of the can strikes the spring 285, a deflecting finger 288 is provided extending upwardly from the center of the forward edge of the platform section 280. The deflector 288 is seldom brought into operation because the great majority of the cans will summersault over the spring 285 without moving axially, but occasionally a can will tend to move inwardly and in that case the deflector 288 prevents the sliding of the mouth of the can along the platform section 280 and the can will be properly uprighted on the platform 34. As the can is summersaulted it is guided between two guards 284 extending from the rear end of the can carriage.

The platform 34 of which the channel iron 287 determines the rear edge extends transversely across the discharge end of the machine and is supported on the longitudinal angle irons 289 extending from the second last pair of uprights 33 to the final, short pair of uprights 33. At its forward edge the platform 34 is supported by the channel iron 290 extending transversely of the two final uprights 33. The cans are discharged onto platform 34 at a point in alinement with the bars 29. At its forward edge and opposite the spring 285 the platform 34 is provided with the upright guard plate 292 to prevent the uprighting can from toppling off the end of the machine. At the left hand edge of the platform 34 there is a guard plate 293 which extends from the second last to the last upright at the left hand side of the machine.

The uprighted can is moved transversely across the discharge end of the machine on the platform 34 into position to receive a spray of water against its bottom previous to receiving its cover and its discharge from the machine, which actions take place substantially simultaneously. The uprighted can is moved transversely of the discharge end of the machine by means of an arm 294 the upper end of which carries a can-engaging piece 295 and the lower end of which is fixed on a shaft 296 journaled in bearings 297 resting on cross pieces 298 extending between the last two pairs of uprights 33. The arm 294 is oscillated by means of a link 300 connecting the arm 294 with an arm 301 fixed to and projecting upwardly from the shaft 148. Bearing in mind that the shaft 148 is turned in a clockwise direction, viewing Fig. 2, as the can carriage descends, it will be seen that the arm 294 is returned to normal position, as indicated by the dotted lines in Fig. 2, when the can carriage is descending, and that the arm 294 is swung to push the can across the discharge end of the machine and to a position under the cover runway on the up stroke of the can carriage, as indicated in full lines in Fig. 2. Although the arm 294 is swung into normal position as the can carriage is descending and the dried can is being summersaulted onto the platform 34, the parts are so timed in their movements that the can-engaging piece 295 reaches the position shown in dotted lines in Fig. 2 just before the bottom of the can comes down onto the platform. The arm 294 then remains stationary while the can carriage travels toward the intake end of the machine and on the next rise of the carriage the arm 294 is swung through its can-moving oscillation. The upper end of the arm 294 travels in a slot 303 cut in the platform 34. As the can approaches the right hand side of the platform 34 the rear side of the can encounters a cam plate 305 fixed on the channel iron 287 and is deflected forwardly by it.

As the can reaches the right hand side of the platform 34 the can moves onto the free end of a plate-like lever 306 pivoted at 307 in the extensions 308 of the platform. The under surface of the plate 306 is provided with an adjustable valve actuating member 309 which rests on the upper end of the valve stem 310 of the valve 311 which controls the passage of hot water from the pipe 106 to the nozzle 107 for directing the spray against the bottom of the can. While the can remains in contact with the plate 306 it presses it down and thereby operates the valve 311. The can continues in engagement with the plate 306 while the can carriage is moving forward, during which time the bottom of the can is thoroughly washed by the spray from the nozzle 107. In order that no damage may be imparted either to the can or to the cross piece 295 as the can reaches the end of its travel across the platform 34 a yieldingly mounted guard rail 313 is provided at the right hand end or side of the platform 34. The rear end of the rail 313 is secured to a pivot pin 314 journaled in a bracket 315 supported from the channel iron 287. A spring 316 encircling the upper end of the pin 314 yieldingly holds the offset part 317 of the free end of the rail 313 against the end of the platform 34.

The can reaches its position at the right hand side of the platform 34 just about as the carriage completes its upward travel. As the carriage begins its next forward step an upright finger 319 carried by a bracket arm 320 extending forwardly from the inner side of the front end of the can carriage engages the rear side of the can which is now pausing over the nozzle 107 and pushes it forward off the platform 34 and onto a conveyor of usual form the intake end of which is indicated at 321. The finger 319 travels in a slot 322 cut in the platform 34. The can continues to depress the plate 306 while it is in engagement therewith and consequently the nozzle 107 directs the spray against the bottom of the can while the can is passing over it.

During the advance of the can from station I to the position over the summersaulting device 76 the cover of the can is advanced from its position over the nozzle 268 at station P to the point occupied by the cover marked 324 in Figs. 7, 11 and 12. The cover 324 now occupies its final position on the cover runway, and the next forward movement of the last cover engaging finger 193 will push it off the rails 186 and 187. This will take place as the finger 319 is pushing the can off the platform 34, the ends of the rails 186 and 187 terminating just forward of the end of the platform 34, as shown in Fig. 7. As the cover falls it is received in the open mouth of the can. At the end of the cover runway the rails 186 and 187 are provided with the guard plates 325.

The left hand of the machine is provided throughout its length and height with a sheathing indicated at 327 and the entire top of the machine is provided with the hood 328.

The operation of the various parts constituting the improved can washer has been indicated during the description of the construction of such parts. The mode of operation of the complete machine is briefly as follows:—An operator or attendant stands at the intake end of the machine. When he removes the cover from a can be places it top side up in the chute 207. He then empties the can and places it in inverted position over the false nozzle at station A. The operation of the machine is continuous and automatic, except for the manual placing of the cans and covers in the machine at the intake end thereof. If a can is placed at station A, and its cover in chute 207, each time the can carriage moves through the step towards the discharge end of the machine, all the stations of the machine will be constantly and successively occupied by cans and covers undergoing treatment. Although a cover may be placed in the chute 207 independently of the placing of its can over the false nozzle at station A, the cover will not be advanced along the cover runway until its can has been placed in the machine at station A. A can, of course, can be carried through the machine unaccompanied by its cover, but this can be avoided by always placing the cover in the chute 207 before the can is placed on the bars 29 at station A. The can can conveniently be placed over the false nozzle at station A at any time after the carriage has removed the preceding can therefrom and carried it toward station B and until the carriage completes its four-step cycle of movements by returning to station A. The attendant therefore has no difficulty in placing the inverted can in the machine which will operate at a speed consistent with the utmost speed with which the attendant can properly empty the cans previous to placing them in the machine.

Assuming that the attendant has placed a cover top side up in the chute 207 and its can in inverted position over the false nozzle at station A, and that the can carriage is now returning toward the intake end of the machine with the pinions 51 in engagement with the upper gear sections 63, as the can carriage completes its return movement the latch 216 is positioned under one side of the mouth of the can resting on the bars 29 at station A. As the can carriage rises on the first step of its cycle of movements, with the pinions 51 in engagement with the gear sections 64, the latch 216 first encounters the mouth of the can, before the bottom sections of the angle irons 35 encounter the mouth of the can, and the latch is thereby swung on its pivot point and pushes the pin 219 outwardly so as to position its outer end under the cam arm 223. The continued rise of the can carriage lifts the can from over the false nozzle at station A and simultaneously therewith the pin 219 engages with the arm 223 and swings the arms 226, thereby bringing its upper end 232 against the cover in the bottom of the chute 207 and moving it to the position indicated by the cover at 227 in Fig. 6. As the carriage completes its upward travel the pin 219 passes upwardly beyond the arm 223, permitting the arm 226 to return to normal position, and simultaneously therewith the finger 228 is positioned behind the cover. The can carriage now moves toward the discharge end of the machine, with the pinions 51 meshing with the gear sections 65, to position the can over the false nozzle at station B, and at the same time the finger 228 advances the cover to the point occupied by the cover marked 229 in Figs. 6, 11 and 12. The next or downward movement of the can carriage, with the pinions 51 in mesh with the gear sections 66, deposits the can over the nozzle at station B, and causes the can engaging fingers 193 to be raised above the covers. Nothing else occurs to the can and its cover during this first downward travel of the can carriage.

While the carriage is returning to its initial position, the first feeler 177, which was opposite station C when the first can was being deposited at station B, is brought into engagement with the mouth of the can at station B, thereby pushing the first rod 168 outwardly into alinement with the finger 169 associated with the valve 80. On this return movement of the carriage, the first cover-engaging finger 193 is positioned above and behind the cover 229. The can carriage now rises on its second upward travel, with the feeler 177 in engagement with the mouth of the can, thereby holding the rod 168 out in position so that it will engage with the finger 169 as the carriage positions the can over the nozzle at station C. The upward travel of carriage positions the first finger 193 behind the cover 229.

The engagement of the first rod 168 with the first finger 169 as the carriage positions the can over the nozzle at station C causes the plate 161 and the actuating member 166 associated with the first finger 169 to be swung into alinement with the stem 139 of valve 80. As the carriage moves the can from station B to station C, the first finger 193 pushes the cover from position 229 to position 230.

During the second descent of the can carriage, that is to say, while it is depositing the can over the nozzle at station C, the oscillation of the shaft 142 causes the actuating member 166 to depress the stem 139 and open the valve 80. The opening of the valve 80 results in the simultaneous rinsing of the interior of the can by the nozzle at station C, the rinsing of the upper and lower surfaces of the cover 230, and the directing of streams of water against the outsides of the can at station C through the vertical pipes 82. The valve 80 continues open while the carriage is completing its downward travel, is moving toward the intake end of the machine to complete its four-step cycle of movements, and is passing through the first part of its upward travel. The washing of the outer surfaces of the cylindrical portion of the can at station C is most effective, of course, just as the pipes 82 are passing station C. While the carriage was descending to deposit the can over the nozzle at station C the rod 168 passed below the lower end of the finger 169, so as to permit the spring 179 to swing the arm 170 and finger 169 into normal position to prevent the next preceding rod 168 from passing behind the finger 169 when coming to the end of its rearward movement at station C. When the carriage on its upward stroke reaches the point at which the valves are opened on the downward stroke of the carriage, the cam 159 opposite station C becomes disengaged from the plate 161 by reason of the reverse oscillation of shaft 142, thereby permitting the spring 165 to lift the plate 161 and disengage the actuating member 166 from the valve stem 139 and thereafter swing the plate 161 into normal position with the member 166 out of alinement with the valve stem.

The continued step by step advance of the can and of its cover through the machine, the placing of the can over the successive nozzles, and the operation of the parts for treating the can and the cover as they pause at the successive stations, are simply a repetition of what takes place during the advance of the can from station B to station C, and the return of the carriage to the initial point in its cycle of movement. When finally the can is lifted from over the air nozzle at station I on the completion of the drying operation, the can is moved on the next step of the carriage toward the discharge end of the machine to position over the summersaulting device 76 and the cover which has been dried at station P is moved to the position occupied by cover 324. On the next downward travel of the carriage the can is landed on the device 76 and tipped thereby onto the spring 285 and so summersaulted onto the platform 34. While the carriage was moving downward the arm 294 was swung to position the cross piece 295 to one side of the uprighted can. During the rearward stroke of the carriage the cross piece 295 remains stationary while the final cover engaging finger 193 is moved backward beyond the cover 324. On the upward stroke of the carriage the arm 294 is swung to move the can transversely across the discharge end of the machine and position it on the plate 306 to effect the opening of the valve 311 connected with the nozzle 107 for washing the bottom of the can. During this upward stroke of the carriage the final cover engaging finger 193 is placed behind the cover 324. Then on the next or final forward movement of the carriage (so far as the can in question is concerned) the finger 319 pushes the can off the platform 34 onto the conveyor 321 and simultaneously therewith the final finger 193 pushes the cover 324 off the rails 186 and 187 so that it falls into the open mouth of the can. This completes the automatic treatment of the can and its cover.

Having thus described the invention what I claim as new is:—

1. In a machine for cleansing cans and the like, comprising, an elongated stationary can support, a plurality of equally-spaced nozzles projecting upwardly from the support for directing fluid against the inner surfaces of a can lowered over the nozzles successively, a carriage having an upward, forward, downward and backward movement for advancing the can along the support and raising and lowering it over the nozzles successively, a plurality of valves corresponding to the nozzles for controlling the passage of fluid to the nozzles, an actuating member for each valve normally out of alinement with the valve, means connected with the carriage for operating the valve actuating member each time the carriage moves vertically, means controlled by the can for alining the actuating member with the valve, a cover runway arranged parallelly with but above and to one side of the can support, the discharge end of the cover runway extending beyond the discharge end of the can support, means actuated by the carriage for advancing the cover of the can along the runway, means for supporting the cover when the can is placed in the machine at the first nozzle, means controlled by the can at the first nozzle and actuated by the carriage for placing the cover within range of the cover advancing means, a plurality of nozzles controlled by the valves for directing fluid against the cover, a platform arranged transversely across the discharge end of the machine, a summersaulting device located beyond the last can nozzle and effective on the down stroke of the carriage to turn the can right side up on the platform, means for moving the uprighted can to position under the discharge end of the cover runway, and means connected with the carriage for pushing the can off the platform as the cover advancing means pushes the cover off the runway.

2. A machine for cleansing cans and the like, comprising, a stationary horizontally-extending can support, a series of equally-spaced nozzles projecting upwardly from the support and adapted to direct fluid against the interior surfaces of cans placed in inverted position on the support over the nozzles, a can being placed manually over the first nozzle, a carriage consisting of spaced horizontally-extending bars for lifting the can from over the first nozzle and successively placing it over the other nozzles, means for imparting an upward, forward, downward and backward movement to the carriage to lift the can from over one nozzle, advance it to the next nozzle, lower it thereover and deposit it on the support, a series of valves for controlling the passage of fluid to the nozzles, valve actuating means normally out of alinement with the valves operated by the up and down movements of the carriage, means controlled by a can in position to be acted on by a nozzle for alining a valve actuating means with its valve, a cover runway, means operated by the carriage for advancing a cover along the runway, means controlled by a can at the first nozzle for placing the cover within range of the cover advancing means, a series of nozzles for directing fluid against the covers, said cover runway being located above and to one side of the can support, a platform extending across the discharge end of the machine, means whereby a can on the downward movement of the carriage is summersaulted into upright position on the platform, means for moving the can transversely across the platform to position under the discharge end of the cover runway, and a can discharging means attached to the carriage, the final forward movement of the carriage and of the cover advancing means discharging the can from the platform and the cover from the runway simultaneously, whereby the cover falls into the open mouth of the can.

3. A machine for cleansing cans and the like, comprising, a stationary frame, a horizontally-extending can support mounted on the frame, a series of equally-spaced nozzles projecting upwardly from the support, a carriage consisting of two horizontally-extending bars one located on one side of and the other located on the other side of the row of nozzles and means for holding the bars in fixed relation, means for moving the carriage upwardly, forwardly, downwardly and rearwardly with respect to the can support whereby a can placed manually over the first nozzle is advanced along the support and deposited thereon over the nozzles successively, a series of valves for controlling the passage of fluid to the nozzles, a series of valve actuating devices normally out of alinement with the valves and operated by the up and down movements of the carriage, means controlled by a can in position to be operated on by a nozzle for alining an actuating device with its valve, a cover runway located above and to one side of the can support, means for advancing a cover along the runway operated by the carriage, means for holding the cover of the can placed over the first nozzle, means controlled by the can at the first nozzle and actuated by the carriage for moving the cover within range of the cover advancing means, a series of nozzles for directing fluid against the covers, a platform extending transversely across the discharge end of the machine, means effective on the downward stroke of the carriage for summersaulting the can onto the platform, means for moving the can across the platform to position under the discharge end of the cover runway, and means connected with the carriage for pushing the can off the platform as the cover is pushed off the runway.

4. A machine for cleansing cans and the like, comprising, a stationary horizontally-extending can support, a series of equally-extending nozzles projecting upwardly from the support, a can being placed manually in inverted position over the first nozzle, a carriage for advancing the can along the support and placing it over the nozzles successively consisting of two horizontally-extending bars one located on one side of and the other located on the other side of the row of nozzles, means for imparting a four-step cycle of movements to the carriage, first, upward to lift the can above the nozzle, next, forward to position the can over the next succeeding nozzle, third, downward to lower the can over the nozzle and deposit it on the support, and fourth, backward to the initial point in the cycle of movements, means for supplying washing fluid to the nozzles as the can moves into position over them to subject the interior of the can to a series of cleansing treatments by fluid directed from the nozzles, a cover runway, means actuated by the carriage for advancing the cover of the can along the runway in timed relation with the advance of the can through the machine, means for subjecting the cover successively to a series of cleansing treatments similar to those to which the can is subjected, and means for discharging the can and cover from the machine.

5. A machine for cleansing cans and the like, comprising, a stationary horizontally-extending support, a series of equally-spaced nozzles projecting upwardly from the support, a can being placed manually in inverted position over the first nozzle, a carriage having an upward, forward, downward and backward movement for placing the can over the nozzles successively, means controlled by the up and down movement of the carriage for supplying fluid to the nozzles, a cover runway, means controlled by the carriage for advancing the cover along the runway in timed relation with the advance of the can through the machine, a series of nozzles for directing fluid against the covers, and means for discharging the can and cover from the machine.

6. A machine for cleansing cans and the like, comprising, a stationary horizontally-extending can support, a plurality of equally-spaced nozzles projecting upwardly from the support for directing fluid against the interior surfaces of a can lowered over the nozzles successively, a carriage having an upward, forward, downward, and backward movement for lowering the can over the nozzles successively and thereby advancing the can along the support, a plurality of valves corresponding to the nozzles for controlling passage of fluid to the nozzles, means actuated by the carriage for operating the valves, and means for preventing the operation of a valve corresponding to a nozzle when a can is not in position over that nozzle.

7. In a machine of the character described including a stationary support and a plurality of equally-spaced nozzles projecting upwardly from the support and adapted to direct fluid against the inner surfaces of a hollow article moved relatively to the support and lowered over the nozzles successively, the nozzles projecting upwardly into the articles a substantial distance, and means moving relatively to the support and having a rectilinear vertical and horizontal movement for lowering the article over the nozzles successively and depositing it on the support at each nozzle.

8. In a machine of the character described including a stationary horizontally-extending can support, and a plurality of equally-spaced nozzles projecting upwardly from the support and adapted to direct fluid against the inner surfaces of a can lowered over the nozzles successively and deposited on the support at each nozzle so that the nozzle projects upwardly within the can a substantial distance, a carriage for advancing the can along the support and depositing it over the nozzles successively, and means for imparting a vertical upward, a forward, a vertical downward and a backward movement to the carriage relatively to the support.

9. In a machine of the character described including a stationary horizontally-extending can support and a plurality of equally-spaced nozzles projecting upwardly from the support and adapted to direct fluid against the inner surfaces of a can lowered over the nozzles successively and deposited on the support at each nozzle, a carriage for advancing the can along the support and lowering it over each nozzle successively, a four-sided gear connected with the carriage, and means acting on the gear whereby a rectilinear upward, forward, downward and backward movement is imparted to the carriage to advance the can from nozzle to nozzle, lower it thereover and deposit the can on the support at the nozzles.

10. In a machine of the character described including a stationary horizontally-extending can support and a plurality of equally-spaced nozzles projecting upwardly from the support and adapted to direct fluid against the inner surfaces of a can lowered over the nozzles successively and deposited on the support at each nozzle with the nozzle projecting upwardly within the can, a carriage consisting of two horizontally-extending bars one located on one side of and the other located on the other side of the row of nozzles and means for holding the bars in spaced relation, said bars being adapted to hold a can in inverted position, lower the can over a nozzle and deposit the can on the support at the nozzle, and means for moving the bars with a rectilinear vertical and horizontal movement relatively to the support whereby the bars advance the can along the support and raise and lower it over the nozzles successively.

11. In a machine of the character described including a stationary horizontally-extending can support and a plurality of equally-spaced nozzles projecting upwardly from the support and adapted to direct fluid against the inner surfaces of a can lowered over the nozzles successively and deposited on the support at each nozzle with the nozzle projecting upwardly within the can, a carriage consisting of a pair of horizontally-extending bars held in spaced relation one on one side of and the other on the other side of the row of nozzles, and means for imparting a vertical upward, a forward, a vertical downward, and a backward movement to the bars relatively to the nozzles and the support for advancing a can in inverted position along the support, raising and lowering the can over the nozzles successively and depositing the can on the support at each nozzle.

12. In a machine of the character described including a series of upstanding stationary nozzles adapted to direct fluid against the inner surfaces of a can lowered over the nozzles successively, a carriage for lowering the can over the nozzle successively so that the nozzle will project upwardly within the can, a four-sided gear attached to the carriage, a pinion meshing with the gear, and means for driving the pinion to impart a vertical upward, a forward, a vertical downward and a backward movement to the carriage.

13. In a machine of the character described including a nozzle for directing fluid against an article, a fixed support for the article while it is being acted on by the nozzle, a carriage having a vertical and a horizontal movement for positioning the article over the nozzle, a valve for controlling the passage of fluid to the nozzle, means actuated by the vertical movements of the carriage for operating the valve, said valve operating means being normally out of alinement with the valve, and means controlled by an article on the carriage for moving the valve operating means into alinement with the valve.

14. In a machine of the character described including a nozzle for directing fluid against an article, a fixed support on which the article rests during the action of the nozzle upon the article, and a carriage having an upward, forward, downward and backward movement for placing the article on the support in position to be acted on by the nozzle, a valve for controlling the passage of fluid to the nozzle, a valve actuating member normally out of alinement with the valve, an oscillatory cam for moving the actuating member each time the cam oscillates, connections between the carriage and the cam for oscillating the cam each time the carriage moves vertically, and means controlled by an article on the carriage for alining the actuating member with the valve.

15. In a machine of the character described including a nozzle for directing fluid against an article, a stationary support on which the article rests during the action of the nozzle against the article and a carriage having an upward, forward, downward and backward movement for depositing the article on the support in position to be acted on by the nozzle, a valve for controlling the passage of fluid to the nozzle, a valve actuating member normally out of alinement with the valve, an oscillatory cam acting on the actuating member each time the cam oscillates, connections between the carriage and the cam whereby the cam is oscillated to move the valve actuating member as the carriage moves downward, the cam continues in engagement with the actuating member as the carriage moves rearward, and the cam is oscillated out of engagement with the actuating member as the carriage moves upward, and means movably mounted on the carriage and controlled by an article thereon for alining the actuating member with the valve.

16. In a machine of the character described including a nozzle for directing fluid against an article and means for advancing the article to the nozzle, a valve for controlling the passage of fluid to the nozzle, an oscillatory cam, a plate located between the cam and the valve and moved toward the valve each time the cam oscillates, a valve actuating member secured to the plate and being normally out of alinement with the valve, said plate being movable relatively to the cam so as to move the actuating member into and out of alinement with the valve, a finger for moving the plate relatively to the cam to aline the actuating member with the valve, said finger being movable relatively to the plate, means carried by the article advancing means and controlled by an article thereon for engaging the finger and moving the plate relatively to the cam to aline the actuating member with the valve, and means operative upon the disengagement of the finger by the means carried by the article advancing means for returning the finger to normal position while leaving the actuating member in alinement with the valve.

17. In a machine of the character described including a nozzle for directing fluid against an article and a carriage for advancing the article to position to be acted on by the nozzle, a valve for controlling the passage of fluid to the nozzle, an oscillatory cam, a fixed pin, a plate pivotally and slidingly mounted on the pin and arranged to be moved toward the valve each time the cam oscillates, a valve actuating member secured to the plate, a spring acting on the plate to hold the actuating member normally out of alinement with the valve and for moving the plate in the direction opposite to that in which the cam moves it, a finger pivotally mounted on the pin and having provision for moving the plate to aline the actuating member with the valve, a rod movably mounted on the carriage and arranged to be positioned by an article thereon to move the finger to aline the actuating member with the valve, and means for returning the finger to normal position upon the disengagement of the rod from the finger while leaving the actuating member in engagement with the valve.

18. In a machine of the character described including a stationary horizontally-extending support, a plurality of equally-spaced nozzles projecting upwardly from the support, a carriage having an upward, forward, downward and rearward movement for placing a can in inverted position over the nozzles successively, and a summersaulting device located beyond the last nozzle against which the can falls on the down stroke of the carriage, the momentum of the can as it strikes the device causing the can to summersault into upright position and a platform onto which the can is uprighted.

19. In a machine of the character described including a stationary horizontally-extending support, a plurality of equally-spaced nozzles projecting upwardly from the support, a carriage having an upward, forward, downward and rearward movement for placing a can in inverted position over the nozzles successively, a summersaulting device located beyond the last nozzle and consisting of two parts:—a plate equally spaced with the nozzles and a resilient bar located beyond the plate, the plate having a cutaway portion so that as the can on the down stroke of the carriage is lowered onto the plate the can tilts onto the resilient bar and is uprighted, and means onto which the can is uprighted.

20. In a machine of the character described including a stationary horizontally-extending support, a plurality of equally-spaced nozzles projecting upwardly from the support, a carriage having an upward, forward, downward and rearward movement for placing a can in inverted position over the nozzles successively, a summersaulting device located beyond the last nozzle and comprising two parts:—the first part consisting of a horizontally-arranged plate and an obliquely arranged plate having an upturned lower end, and the second part consisting of a flexible bar located beyond the obliquely-arranged plate, the rear edge of the horizontal plate being spaced from the last nozzle substantially the length of the forward and backward stroke of the carriage so that as the can on the downward stroke of the carriage is landed on the horizontal plate it tilts toward the flexible bar and is thereby turned into upright position, and a platform located beyond the flexible bar onto which the can is uprighted.

21. In a machine of the character described including a series of nozzles for successively washing and drying a can placed in inverted position over the nozzles, a carriage having an upward, forward, downward and backward movement for placing the inverted can over the nozzles successively, a cover runway located to one side of and above the nozzles, means controlled by the carriage for advancing a cover along the runway in timed relation with the advance of the can through the machine, means located beyond the last nozzle and effective on the down stroke of the carriage for turning the can into upright position, a platform onto which the can is uprighted, the discharge end of the cover runway terminating over one side of the platform, means controlled by the carriage for moving the can transversely and placing it under the rear end of the cover runway, and means connected with the carriage for pushing the can off the platform.

22. A machine for cleansing cans and the like, comprising, a stationary horizontally-extending can support, a plurality of equally-spaced nozzles projecting upwardly from the support for directing fluid against the inner surfaces of a can lowered over the nozzles successively, means for lowering the can over the nozzles successively and thereby advancing the can along the support, means operated by the can advancing means and controlled by the can for admitting fluid to the nozzles a cover runway, and means actuated by the can advancing means for advancing the cover of the can along the runway.

23. In a machine of the character described including a series of nozzles for directing fluid against a can and a carriage having an upward, forward, downward and backward movement for placing the can over the nozzles successively, a cover runway along which the cover of the can is adapted to be advanced, means for advancing the cover consisting of a series of fingers having a pivotal and a horizontal-reciprocating movement, and means connecting the fingers with the carriage whereby when the carriage moves vertically the fingers are pivoted and when the carriage moves forward and backward the fingers are reciprocated.

24. In a machine of the character described including an elongated stationary support and a plurality of equally-spaced nozzles projecting upwardly from the support and adapted to direct fluid against the inner surfaces of a hollow article advanced along the support and lowered over the nozzles successively so that the nozzles project upwardly a substantial distance within the article, means for advancing the article along the support by lowering the article over the nozzles successively and depositing the article on the support at each nozzle, said means having first a vertical upward movement to lift the article above the nozzle, then a forward movement to position the article over the next nozzle, then a vertical downward movement to lower the article over said next nozzle and deposit it on the support, and finally a rearward movement back to the first nozzle.

25. In a machine of the character described including an elongated stationary support and a plurality of equally-spaced nozzles projecting upwardly from the support and adapted to direct fluid against the inner surfaces of a hollow article advanced along the support and lowered over the nozzles successively so that the nozzles will project upwardly within the article a substantial distance, means having a vertical upward, a forward, a vertical downward and a rearward movement for advancing the article along the support and lowering it over the nozzles successively and depositing it on the support at each nozzle.

26. In a machine of the character described, an elongated can support, a series of nozzles rising from the support adapted to direct fluid against the inner surfaces of cans placed in inverted position on the support over the nozzles, a carriage movable relatively to the support for transporting the cans to the nozzles successively, and a vertically arranged perforated pipe mounted on the carriage for directing fluid against the outer surfaces of the can as the carriage moves relatively to the support.

27. In a machine of the character described, an elongated can support, a series of equally-spaced nozzles projecting upwardly from the support and adapted to direct fluid against the inner surfaces of a can placed in inverted position over the nozzles successively, a carriage having an upward, forward, downward and rearward movement for advancing the can along the support and placing it over the nozzles successively, and means mounted on the carriage for directing fluid against the outer surfaces of the can as the carriage moves relatively to the support.

28. In a machine of the character described, means for supporting an article in inverted position, means moving relatively to the support and article for shifting the article on its support, said movable means being capable of movement independently of the article and spray means mounted on the article-shifting means for directing a spray of cleansing fluid against the exterior surfaces of the article as the moving article-shifting means carries the spray means past the article.

29. In a machine of the character described, means for supporting a can in inverted position, a carriage for shifting the can, said carriage also having a path of travel independently of and past the can, and a vertically-arranged perforated pipe mounted on the carriage for directing streams of cleansing fluid against the exterior surfaces of the can as the carriage moves the pipe past the can.

30. In a machine of the character decribed, a horizontally-arranged can support for holding a can in inverted position, a carriage arranged to move longitudinally of the can support to shift the can on its support, said carriage being capable of movement independently of the can and two vertically arranged pipes mounted on the carriage and located on opposite sides of the can, said pipes being perforated on their inner sides for directing streams of cleansing fluid against the exterior surfaces of the can as the carriage moves them past the can.

JOHN M. McCLATCHIE.